(12) United States Patent
Shirai

(10) Patent No.: US 8,775,076 B2
(45) Date of Patent: Jul. 8, 2014

(54) POSITION CALCULATING METHOD AND POSITION CALCULATING DEVICE

(75) Inventor: Tsubasa Shirai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 13/444,728

(22) Filed: Apr. 11, 2012

(65) Prior Publication Data
US 2012/0259543 A1    Oct. 11, 2012

(30) Foreign Application Priority Data
Apr. 11, 2011   (JP) .................................. 2011-087422

(51) Int. Cl.
*G01S 19/42*   (2010.01)
(52) U.S. Cl.
USPC ................... 701/469; 701/478.5; 342/357.25
(58) Field of Classification Search
None
See application file for complete search history.

(56) References Cited

U.S. PATENT DOCUMENTS

| | | | |
|---|---|---|---|
| 7,904,244 B2 * | 3/2011 | Sugla | 701/300 |
| 7,956,808 B2 * | 6/2011 | Boyer et al. | 342/451 |
| 2009/0099773 A1 | 4/2009 | Watanabe | |
| 2010/0039228 A1 * | 2/2010 | Sadr et al. | 340/10.1 |

FOREIGN PATENT DOCUMENTS

JP    2009-097897 A    5/2009

* cited by examiner

*Primary Examiner* — Michael J Zanelli
(74) *Attorney, Agent, or Firm* — Kilpatrick Townsend & Stockton LLP

(57) ABSTRACT

A position calculating method comprising: receiving a positioning signal; and performing a position calculating operation using the received positioning signal, the position calculating operation being a operation based on a given probability distribution model having at least a variation in previous operation result as a random variable.

7 Claims, 17 Drawing Sheets

POSITION CALCULATING METHOD AND POSITION CALCULATING DEVICE

This application claims priority to Japanese Patent Application No. 2011-087422, filed Apr. 11, 2011, the entirety of which is hereby incorporated by reference.

BACKGROUND

1. Technical Field

The present invention relates to a position calculating method and a position calculating device.

2. Related Art

A global positioning system (GPS) is widely known as a positioning system using a positioning signal and is used for a position calculating device built in a mobile phone, a car navigation apparatus, and the like. In the GPS, a position calculating operation of acquiring a position coordinate and a clock error of the position calculating device is performed on the basis of information such as positions of plural GPS satellites or a pseudo-range from the respective GPS satellites to the position calculating device.

As the position calculating operation using a satellite positioning system, a position calculating operation using a so-called least-square method of minimizing the square of an error (hereinafter, referred to as a "pseudo-range error") included in the pseudo-range measured using signals received from plural positioning satellites is known (for example, see JP-A-2009-97897).

Regarding the above-mentioned position calculating operation, the position calculating operation using the least-square method or the like is generally performed individually for each time (hereinafter, referred to as an "operation time") to perform the position calculating operation. Accordingly, for example, when a large error is instantaneously infiltrated into the measured pseudo-range, there is a disadvantage that the accuracy of the position calculating operation at that time is rapidly lowered, but there is an advantage that the rapidly-lowered accuracy does not affect the subsequent position calculating operation. However, the occurrence of a so-called position jump that a position greatly separated from the true position is instantaneously obtained as the operation result may cause a serious problem in some cases.

SUMMARY

An advantage of some aspects of the invention is that it provides a position calculating method which can improve position calculation accuracy.

A first aspect of the invention is directed to a position calculating method including: receiving a positioning signal; and performing a position calculating operation using the received positioning signal, the position calculating operation being a operation based on a given probability distribution model having at least a variation in previous operation result as a random variable.

As another aspect of the invention, a position calculating device may be configured to include: a receiver unit that receives a positioning signal; and a position calculating unit that performs a position calculating operation using the positioning signal received by the receiver unit, the position calculating operation being a operation based on a given probability distribution model having at least a variation in previous operation result as a random variable.

According to the first aspect and the like, the position calculating operation using the received positioning signal, the position calculating operation being a operation based on a given probability distribution model including at least a variation in previous operation result as a random variable is performed. Accordingly, it is possible to calculate a position by temporally correlating the operation results without independently using the operation results. In this case, even when a great error is instantaneously infiltrated into the measured quantity, it is possible to prevent the position calculation accuracy from being lowered.

As a second aspect of the invention, the position calculating method of the first aspect may be configured to further include: updating a criterion of the variation based on the previous operation result; and calculating the variation using the criterion.

In the second aspect, it is possible to reflect the result of the previous position calculating operation in the result of the current position calculating operation, by updating the criterion of the variation based on the previous operation result. It is possible to improve the position calculation accuracy by calculating the variation in operation result using the updated criterion.

As a third aspect of the invention, the position calculating method of the first or second aspect may be configured such that the position calculating operation is an operation based on a normal distribution model having at least the variation of the previous operation result as a random variable, and the position calculating method further includes updating the normal distribution model based on the previous operation result.

In the third aspect, the position calculating operation based on the normal distribution model having at least the variation in the previous operation result as a random variable is performed. That is, it is assumed that the distribution of the variation in the previous operation result is pursuant to a normal distribution. In addition, by updating the normal distribution model based on the previous operation result without setting the normal distribution model to be fixed, it is possible to detect a position based on a suitable normal distribution model corresponding to a temporal variation.

As a fourth aspect of the invention, the position calculating method of the third aspect may be configured such that the position calculating method further includes measuring a pseudo-range based on the received positioning signal, and the position calculating operation is an operation based on the normal distribution model having the variation of the previous operation result as a random variable and a probability distribution model having an error included in the pseudo-range as a random variable.

In the fourth aspect, the pseudo-range is measured based on the received positioning signal of the positioning signal. The position calculating operation is performed based on the normal distribution model having the variation in the previous operation result as a random variable and the probability distribution model having the error included in the pseudo-range as a random variable. It is possible to appropriately perform the position calculating operation by using the probability distribution model having the error included in the pseudo-range as a random variable in addition to the normal distribution model having the variation in the previous operation result as a random variable.

As a fifth aspect of the invention, the position calculating method of the fourth aspect may be configured such that the probability distribution model having the error included in the pseudo-range as a random variable is a normal distribution model or a normal mixture distribution model.

In general positioning environments, the distribution of the error included in the pseudo-range can be assumed to be pursuant to a normal distribution. However, like a multipath environment, it is not necessarily suitable that the distribution of the error included in the pseudo-range be assumed to be a normal distribution. Therefore, as in the fifth aspect, by performing the position calculating operation using the probability distribution model having the error included in the pseudo-range as a random variable, which is a normal distribution model or a normal mixture distribution model, it is possible to appropriately perform a position calculating operation suitable for the positioning environments.

As a sixth aspect of the invention, the position calculating method of any of the third to fifth aspects may be configured such that the position calculating operation is an operation of calculating at least any one of position information, clock bias, velocity information, and clock drift, and the normal distribution model is a model having variations of elements of the previous operation result as random variables.

In the sixth aspect, the position calculating operation of calculating at least any one of the position information, the clock bias, the velocity information, and the clock drift is performed. At this time, by using the normal distribution model having variations of elements of the previous operation result as random variables, it is possible to perform a position calculating operation in which the elements are temporally correlated with each other.

As a seventh aspect of the invention, the position calculating method of any of the first to sixth aspects may be configured such that the position calculating method further includes calculating a value of a predetermined parameter out of calculation parameters by performing a predetermined convergence operation using the received signal, the calculation parameters being able to be calculated through the use of the position calculating operation and the position calculating operation is an operation using the value of the predetermined parameter previously calculated through the use of the convergence operation.

In the seventh aspect, the value of a predetermined parameter out of the calculation parameters which can be calculated through the use of the position calculating operation is calculated by performing a predetermined convergence operation using the received signal. The position calculating operation using the value of the predetermined parameter calculated through the previous convergence operation is performed. Accordingly, it is possible to perform a predetermined convergence operation to calculate the value of a specific calculation parameter without giving a temporal correlation thereto. By reflecting the calculation result in the position calculating operation determined based on a given probability distribution model, it is possible to effectively calculate a position.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
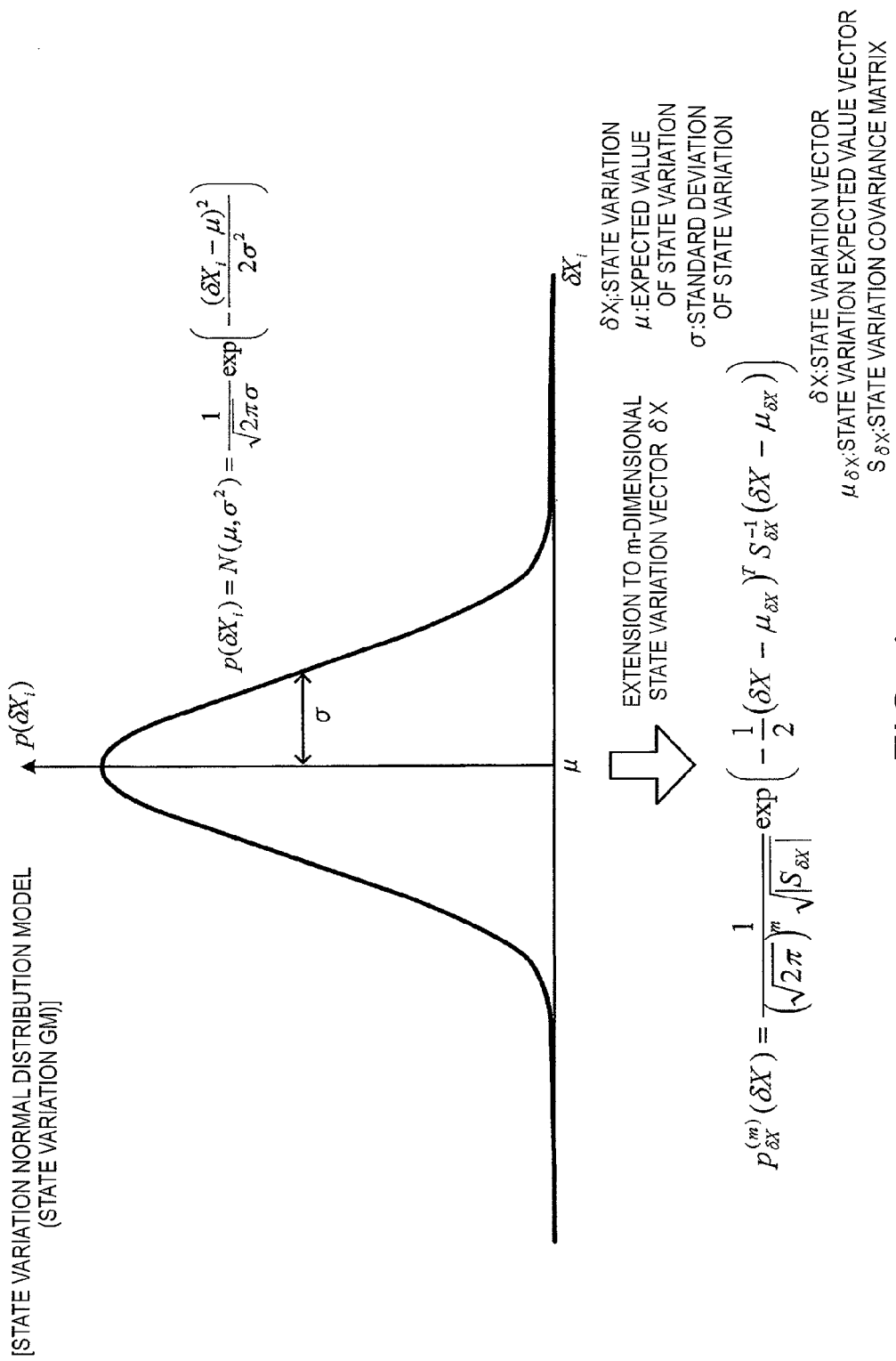
FIG. 1 is a diagram illustrating a state variation normal distribution model.

Hereinafter, an example of an exemplary embodiment of the invention will be described with reference to the accompanying drawings. This exemplary embodiment is an embodiment employing a GPS (Global Positioning System) which is a kind of satellite positioning system. The invention is not limited to the below-described embodiment.

1. Principle

A position calculating method (the principle of position calculation) according to this embodiment will be described below. In a satellite positioning system using a GPS, a GPS satellite which is a kind of positioning satellite loads a GPS satellite signal, which is a kind of positioning satellite signal, with navigation data including satellite orbit data such as an ephemeris or an almanac and emits the resultant GPS satellite signal.

The GPS satellite signal is a communication signal of 1.57542 GHz modulated with a C/A (Coarse and Acquisition) code which is a kind of spread code through the use of a CDMA (Code Division Multiple Access) system known as a spread spectrum system. The C/A code is a pseudo-random noise code with a cycle period of 1 ms and with a code length of 1023 chips as 1 PN frame and is a code specific to the respective GPS satellites.

In the GPS, a position calculating operation of calculating the position (position coordinate) or a clock error (clock bias) of a GPS receiver is performed using measured quantities related to the received signal of a GPS satellite signal, such as positions of plural GPS satellites or pseudo-ranges from the GPS satellites to the GPS receiver (position calculating device). The pseudo-range is measured by performing a satellite search to capture a GPS satellite signal and using measurement information obtained as the result.

The satellite search includes a correlating operation in the phase direction (hereinafter, referred to as "phase search") on the received signal of a GPS satellite signal and a correlating operation in the frequency direction (hereinafter, referred to as "frequency search"). By performing the phase search, the phase of the C/A code (hereinafter, referred to as "code-phase") when the GPS receiver receives the GPS satellite signal can be acquired as measurement information. By performing the frequency search, a reception frequency or a Doppler frequency of the GPS satellite signal received by the GPS receiver can be acquired as measurement information.

Conceptually, it can be considered that plural C/A codes are arranged between the GPS satellites and the GPS receiver. The distance between a GPS satellite and the GPS receiver cannot be said to be an integer multiple of the C/A code, but may include a fractional part. The fractional part of the pseudo-range corresponds to the code-phase. The integer part of the pseudo-range is calculated from the rough positions of the GPS receiver and the GPS satellite.

In this embodiment, a position vector "P" and a clock bias (clock error) "b" of the GPS receiver (position calculating device) are considered as unknowns and a state vector "X" of a GPS receiver including them as components is defined by Expression (1).

$$X = \begin{bmatrix} P \\ b \end{bmatrix} = \begin{bmatrix} x \\ y \\ z \\ b \end{bmatrix} = \begin{bmatrix} X_1 \\ X_2 \\ X_3 \\ X_4 \end{bmatrix} \quad (1)$$

In Expression (1), "(x, y, z)" represents position components of the axes of the position vector "P" of the GPS receiver (position calculating device) in a coordinate system in which a positioning process is performed. For the later convenience, the position components "(x, y, z)" and the clock bias "b" are expressed as "$X_i=(x, y, z, b)^T=(X_1, X_2, X_3, X_4)^T$" so as to mean the components of the state vector "X". Here, the subscripts "i=1, 2, 3, 4" represent the numbers of the components of the state vector "X". The superscript "T" represents a transpose of a matrix. In expressions of this embodiment, an arrow indicating a vector is not marked to simplify the description.

The true position vector of the GPS receiver is defined as "P=P_0+δP" and the clock bias is defined as "b=b_0+δb". Here, "δP" and "δb" are unknown variations (changes) applied to initial values of the position vector and the clock bias and are referred to as "position variation vector" and "clock bias variation", respectively. The position variation vector "δP" and the clock bias variation "δb" are collected to define a state variation vector "δX" as expressed by Expression (2).

$$\delta X = \begin{bmatrix} \delta P = P - P_0 \\ \delta b = b - b_0 \end{bmatrix} = \begin{bmatrix} \delta x = x - x_0 \\ \delta y = y - y_0 \\ \delta z = z - z_0 \\ \delta b = b - b_0 \end{bmatrix} = \begin{bmatrix} \delta X_1 \\ \delta X_2 \\ \delta X_3 \\ \delta X_4 \end{bmatrix} \quad (2)$$

In the positioning calculation of the GPS used in the related art, the state variation vector "δX" is calculated, for example, using an observation equation of Expression (3).

$$\delta \rho = G \delta X + E \quad (3)$$

In this specification, the number of a satellite (hereinafter, referred to as a "captured satellite"), which is successfully captured by the GPS receiver, out of the GPS satellites is marked by "k", which is described as a subscript of various quantities in principles. In this embodiment, it is assumed that the GPS receiver successfully captures K GPS satellites in total. That is, "k=1, 2, . . . , K" is assumed.

"δρ" in the left side of Expression (3) represents a pseudo-range change vector and is expressed by Expression (4).

$$\delta \rho = \begin{bmatrix} \delta \rho_1 \\ \delta \rho_2 \\ \vdots \\ \delta \rho_K \end{bmatrix} \quad (4)$$

That is, the pseudo-range change vector "δρ" is a vector having the pseudo-range change "$\delta \rho_k$" of the respective captured satellites as a component.

The matrix "G" in the right side of Expression (3) is a geometric matrix determining the satellite location of the captured satellite and is expressed by Expression (5).

$$G = \begin{bmatrix} (-l_1)^T & 1 \\ (-l_2)^T & 1 \\ \vdots & \vdots \\ (-l_K)^T & 1 \end{bmatrix} \quad (5)$$

Here, "$l_k$" represents a vector in the line-of-sight direction (hereinafter, referred to as an "line-of-sight vector") directed from the GPS receiver to the k-th captured satellite.

"E" in the right side of Expression (3) represents a pseudo-range error vector and is expressed by Expression (6).

$$E = \begin{bmatrix} \varepsilon_1 \\ \varepsilon_2 \\ \vdots \\ \varepsilon_K \end{bmatrix} \quad (6)$$

Here, "$\varepsilon_k$" represents an error (hereinafter, referred to as a "pseudo-range error") included in the pseudo-range from the k-th captured satellite to the GPS receiver. The pseudo-range error vector "E" is a vector having the pseudo-range error "$\varepsilon_k$" of the respective captured satellites as a component.

The number of unknowns in Expression (3) is four including the position variation vector "δP=(δx, δy, δz)" and the clock bias variation "δb". Accordingly, Expression (3) can be solved when K≥4. When K≥4, Expression (3) is an overdetermined equation. In this case, a least-square method of calculating the solution which minimizes the square of the pseudo-range errors "ε" of the K captured satellites is generally used. Specifically, the least-square solution of Expression (3) can be calculated, for example, by Expression (7).

$$\delta X = (G^T G)^{-1} G^T \delta \rho \quad (7)$$

In the position calculating operation using the observation equation of Expression (3), a GPS satellite signal is received, a pseudo-range is measured, and the least-square solution of Expression (7) is analytically acquired. In this case, the state variation vector "δX" is independently calculated for each operation time.

However, the GPS receiver (position calculating device) usually continuously moves. For example, when a user carrying the GPS receiver usually walks or usually travels, a large difference may not be present in the moving distance of the GPS receiver between the operation times. That is, as long as the user does not unusually act, the variation of the position variation vector "δP" of the GPS receiver is expected to be substantially constant. The same is true of the case where the GPS receiver is mounted on a moving object such as a vehicle. Accordingly, the inventor thought out that a given probability distribution model having the variation in the operation result of the position calculating operation as a random variable is defined.

For example, when it is assumed that a user usually walks and the position calculation operation is performed at the "time intervals of 1 second", it is thought that the moving distance of the GPS receiver for each second is "about several meters" and the error width thereof is "about several tens of centimeters" even in consideration of an individual difference. Accordingly, when walking is considered, it can be assumed that the expected value of the position variation vector "δP" out of the operation results of the position calculating operation is "about several meters" and the standard deviation thereof is "about several tens of centimeters". When it is considered that the GPS receiver is mounted on a vehicle, it can be assumed that the expected value of the position variation vector "δP" is "about several tens of meters" and the standard deviation thereof is "about several meters".

When the same idea is applied to the clock bias "b" and a short time interval is considered, it is difficult to think that the clock bias "b" varies greatly as much. Accordingly, a probability distribution model can be assumed for the clock bias variation "δb".

Therefore, the inventor of the invention assumed a normal distribution type probability distribution model (hereinafter, referred to as "state variation normal distribution model") having the state variation vector "δX" which is the variation as a random variable for the state vector "X" having the position vector "P" and the clock bias "b" as components.

FIG. 1 is a diagram illustrating a state variation normal distribution model (state variation GM (Gaussian Model)). FIG. 1 illustrates a model paying attention to a component "δX$_i$" of the state variation vector "δX". The horizontal axis represents the component "δX$_i$" of the state variation and the vertical axis represents the probability density "p(δX$_i$)" thereof. The expected value "μ" of the state variation "δX$_i$" is referred to as a "state variation expected value" and the standard deviation "σ" of the state variation "δX$_i$" is referred to as a "state variation standard deviation".

It is assumed that the state variation "δX$_i$" is included as a random variable and the distribution is pursuant to a normal distribution N(μ, σ$^2$). However, in this embodiment, the state variation vector "δX" includes the components (δx, δy, δz) of the position variation vector "P" and the clock bias variation "δb". Therefore, a one-dimensional normal distribution model is expanded and it is assumed that a multi-dimensional state variation normal distribution model "p$_{δX}^{(m)}$(δX)" expressed by Expression (8) is used.

$$p_{δX}^{(m)}(δX) = \frac{1}{(\sqrt{2\pi})^m \sqrt{|S_{δX}|}} \exp\left(-\frac{1}{2}(δX - μ_{δX})^T S_{δX}^{-1}(δX - μ_{δX})\right) \quad (8)$$

In Expression (8), "m" in the superscript parenthesis represents the number of calculation parameters treated as a random variable. A calculation parameter is a parameter which can be calculated through the position calculating operation and four parameters of (δx, δy, δz, δb) in this embodiment correspond thereto. When all four calculation parameters are used as random variables, the resultant is "m=4". Although details will be described later, some calculation parameters of the four calculation parameters may be used as random variables. In this case, the number of calculation parameters which are used as the radon variables is "m".

The multi-dimensional state variation normal distribution model "p$_{δX}^{(m)}$(δX)" of Expression (8) is a probability density function giving the simultaneous probability of m non-independent random variables. "μ$_{δX}$" represents a state variation expected value vector having expected values of the components of the state variation vector "δX". "S$_{δX}$" represents a state variation covariance matrix having the covariance of the components of the state variation vector "δX". This will be described in detail later using an expression.

In this embodiment, an estimated maximum likelihood solution of the state variation vector "δX" is calculated on the basis of the multi-dimensional state variation normal distribution model "p$_{δX}^{(m)}$(δX)" and a maximum likelihood estimating method. This corresponds to receiving a positioning signal and performing an operation using the received signal of the positioning signal, which is a position calculation operation determined on the basis of the given probability distribution model having the variation in the operation result of the position calculation operation as a random variable. When the estimated maximum likelihood solution of the state variation vector "δX" is calculated, a true state vector "X" can be estimated by adding the calculated estimated maximum likelihood solution to the initial value "X$_0$" of the state vector.

In the position calculating operation of this embodiment, the pseudo-range is measured on the basis of the received signal of a GPS satellite signal. A position calculating operation determined on the basis of the state variation normal distribution model and a probability distribution model having an error included in the pseudo-range as a random variable is performed. That is, the pseudo-range error "ε" is treated as a random variable and the operation is performed on the basis of a given probability distribution model. In this embodiment, the probability distribution model having the pseudo-range error "ε" as a random variable is set to a normal distribution model or a normal mixture distribution model.

Figure 2:
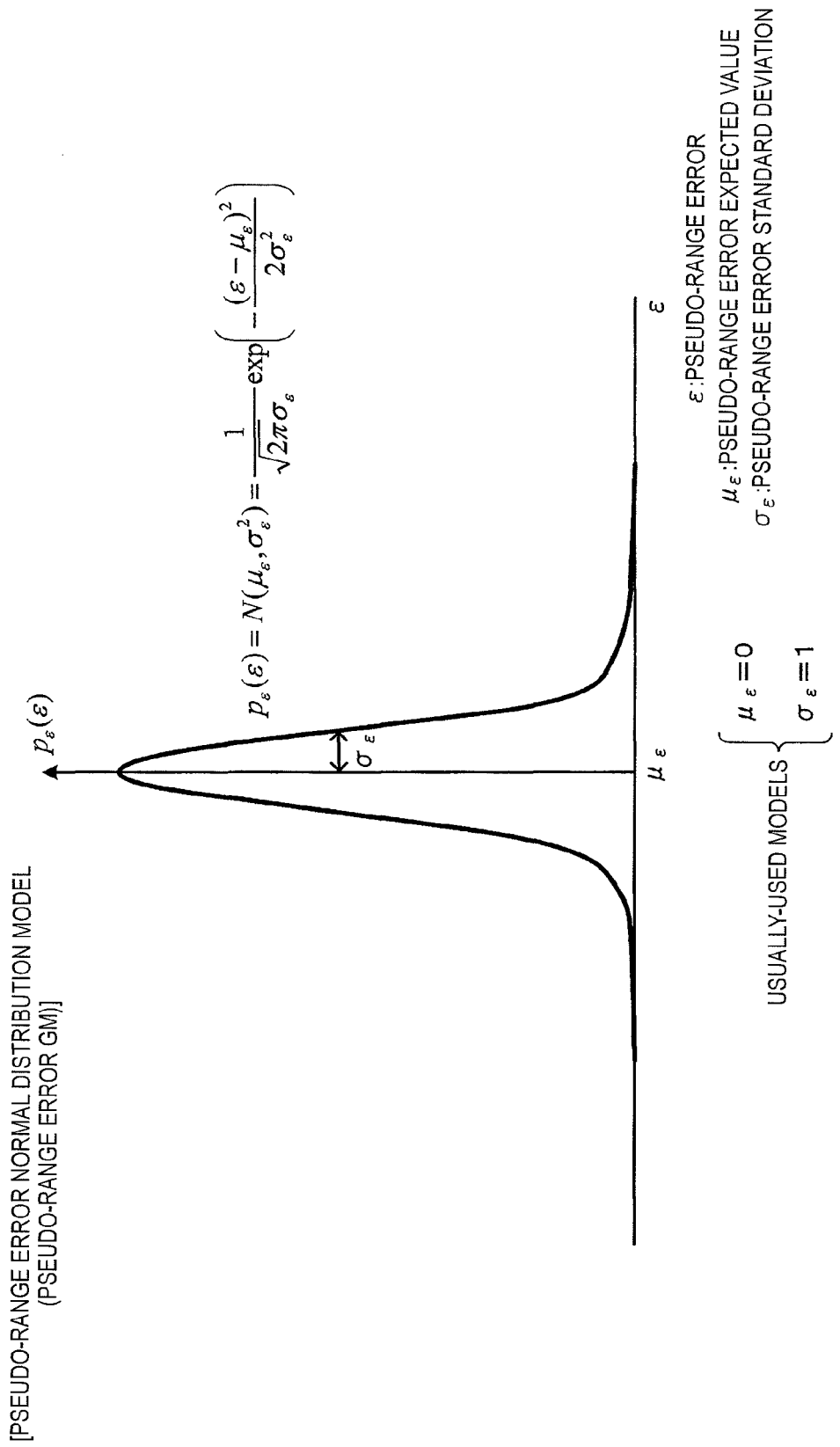
FIG. 2 is a diagram illustrating a pseudo-range error normal distribution model.

FIG. 2 is a diagram illustrating a pseudo-range error normal distribution model (pseudo-range error GM). In FIG. 2, the horizontal axis represents the pseudo-range error "ε" and the vertical axis represents the probability density "p$_ε$(ε)" thereof. The expected value "μ$_ε$" of the pseudo-range error "ε" is referred to as a "pseudo-range error expected value" and the standard deviation "σ$_ε$" of the pseudo-range error "ε" is referred to as a "pseudo-range error standard deviation".

A method of calculating the solution of an observation equation on the assumption that the pseudo-range error "ε" is pursuant to a normal distribution N(μ$_ε$, (σ$_ε$)$^2$) is a least square method. The pseudo-range error normal distribution model with "μ$_ε$=0 and σ$_ε$=1" is widely used and the least square solution thereof agrees to Expression (7).

The pseudo-range error normal distribution model "p$_ε$(ε)" is useful for an environment (for example, an open sky environment") in which the GPS receiver is opened to the sky. In the open sky environment, since GPS satellite signals with high quality can be received from the GPS satellites, it is expected that the pseudo-range error "δ" has a value around zero. However, in an environment in which the GPS receiver is not opened to the sky, the behavior of the pseudo-range error "δ" varies. A typical example thereof is a multi-path environment.

Figure 3:
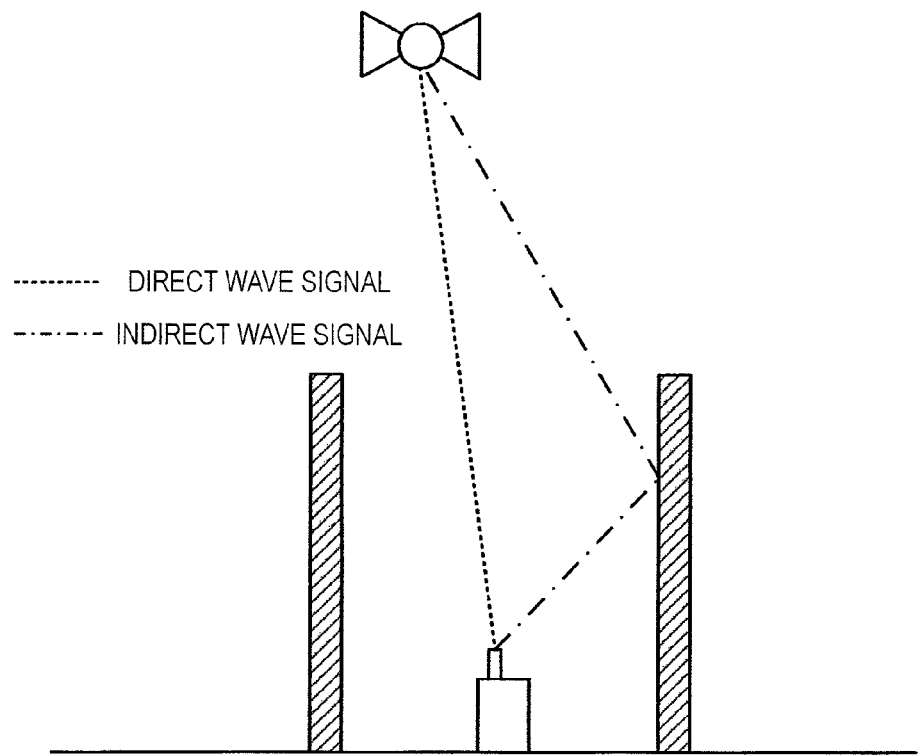
FIG. 3 is a diagram illustrating a multipath.

FIG. 3 is a diagram illustrating a multi-path environment. A direct wave signal is indicated by a dotted line and an indirect wave signal is indicated by a one-dot chained line. Due to the presence of an indirect wave signal, an error is included in the pseudo-range measured by the GPS receiver. The pseudo-range is calculated using a code-phase acquired by causing the GPS receiver to perform the phase search, but an error is superimposed on the code-phase in the multi-path environment. The error of the code-phase may have a positive error value and a negative error value with respect to a true code-phase.

Figure 4:
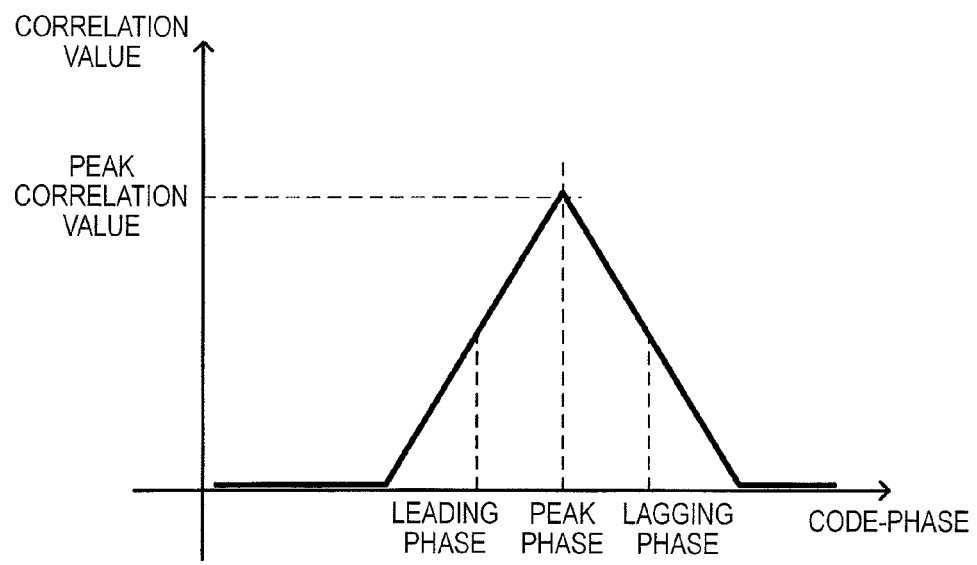
FIG. 4 is a diagram illustrating an example of autocorrelation.

FIG. 4 is a diagram illustrating the principle of code-phase detection. In FIG. 4, the horizontal axis represents the code-phase, the vertical axis represents a correlation value, and an example of an autocorrelation value of the C/A code. In the following description, a correlation value means the magnitude (absolute value) of a correlation value.

The autocorrelation value of the C/A code is ideally expressed as a substantially symmetric triangle with a peak value as a vertex. In this case, the phase corresponding to the peak value (hereinafter, referred to as a "correlation peak value") of the correlation value is the phase of the C/A code of the received GPS satellite signal. To detect the correlation peak value, a code-phase (hereinafter, referred to as a "leading phase") leading by a predetermined amount with respect to a certain code-phase and a code-phase (hereinafter, referred to as a "lagging phase") lagging by a predetermined amount with respect to the certain code-phase can be considered. The correlation value at which the correlation value of the leading phase is equal to the correlation value of the lagging phase is detected as the correlation peak value.

In FIG. 4, since the correlation value has a substantially symmetric triangular shape, the correlation value of the code-phase at the center between the correlation value of the leading phase and the correlation value of the lagging phase is the correlation peak value and the corresponding code-phase is detected as a "peak phase". The detected peak phase is referred to as a "detected peak phase". The shape of the correlation value shown in FIG. 4 is an ideal shape but the shape of the correlation value in the multi-path environment varies.

Figure 5:
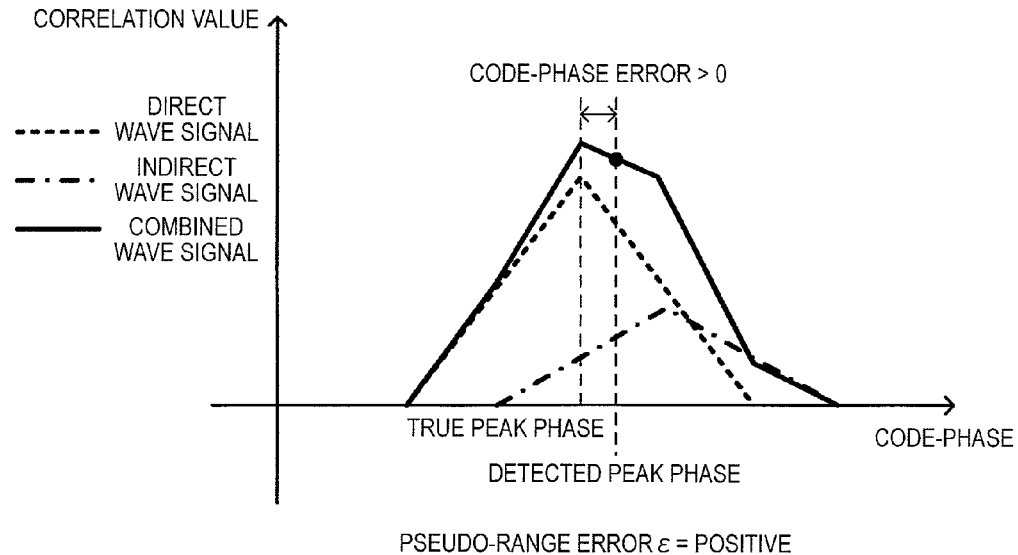
FIG. 5 is a diagram illustrating an example of autocorrelation in a multipath environment.
Figure 6:
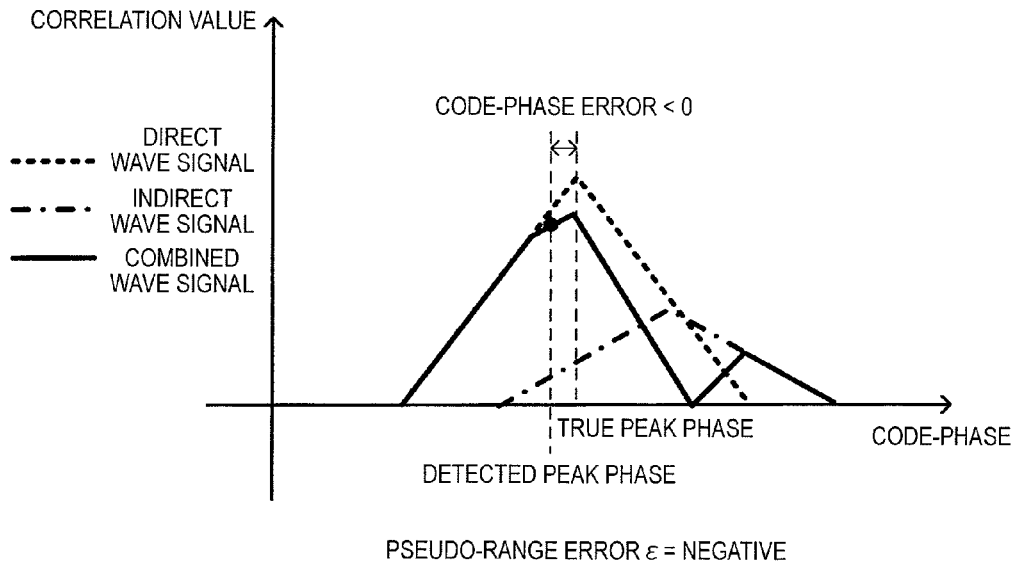
FIG. 6 is a diagram illustrating another example of autocorrelation in a multipath environment.

FIGS. 5 and 6 are diagrams illustrating examples of the shape of the correlation value in a multi-path environment. FIG. 5 shows an example of a graph of the correlation value when an indirect wave signal and a direct wave signal arrive in the same phase and FIG. 6 shows an example of a graph of the correlation value when an indirect wave signal and a direct wave signal arrive in the opposite phase. In these drawings, graphs of the correlation values corresponding to a direct wave signal, an indirect wave signal, and a multi-path signal which is obtained by combining the direct wave signal and the indirect wave signal are shown. The horizontal axis represents the code-phase and the vertical axis represents the correlation value.

The correlation value of the indirect wave signal has a substantially triangular shape, similarly to the correlation value of the direct wave signal, but the magnitude of the correlation peak value of the indirect wave signal is smaller than the correlation peak value of the direct wave signal. This is because a GPS satellite signal sent out from a GPS satellite is reflected by buildings or ground surfaces or transmitted by obstacles and thus the signal intensity when the signal is sent out is weakened at the time of reception.

The peak phase of the indirect wave signal lags behind the peak phase of the direct wave signal. This is because a GPS satellite signal sent out from a GPS satellite is reflected by buildings or ground surfaces or is diffracted by obstacles and thus the propagation distance from the GPS satellite to the GPS receiver increases. Since the correlation value of the multi-path signal is the sum of the correlation value of the direct wave signal and the indirect wave signal, the triangular shape is deformed and is not symmetric about the peak value.

When the indirect wave signal arrives at the GPS receiver in the same phase as the direct wave signal, the direct wave signal and the indirect wave signal reinforce each other. Accordingly, the correlation value of the combined wave signal is the sum of the magnitude of the correlation value of the direct wave signal and the magnitude of the correlation value of the indirect wave signal. In this case, the shape of the correlation value is, for example, the same as shown in FIG. 5. In FIG. 5, the detected peak phase is a phase lagging behind the true peak phase.

On the contrary, when the indirect wave signal in the opposite phase to the direct wave signal, for example, by the range of equal to or more than a half period to less than one period, the direct wave signal and the indirect wave signal weaken each other. Accordingly, the correlation value of the combined wave signal is obtained by subtracting the magnitude of the correlation value of the indirect wave signal from the magnitude of the correlation value of the direct wave signal. In this case, the shape of the correlation value is, for example, the same as shown in FIG. 6. In FIG. 6, the detected peak phase is a phase leading the true peak phase.

Here, the phase difference between the detected peak phase and the true peak phase is defined as a "code-phase error". For convenience, the sign of the code-phase error when the detected peak phase lags behind the true peak phase is defined to be "positive" and the sign of the code-phase error when the detected peak phase leads the true peak phase is defined to be "negative". In this case, the code-phase error in FIG. 5 is "positive" and the code-phase error in FIG. 6 is "negative".

As described above, since the pseudo-range is calculated using the code-phase, the code-phase error is superimposed as an error on the pseudo-range. That is, when a positive error is included in the code-phase as shown in FIG. 5, the pseudo-range error "$\epsilon$" is a positive error. On the other hand, when a negative error is included in the code-phase as shown in FIG. 6, the pseudo-range error "$\epsilon$" is a negative error.

In this way, in the multi-path environment or the like, the pseudo-range error "$\epsilon$" may have a positive value or a negative value depending on the positive or negative sign of the code-phase error. The pseudo-range error "$\epsilon$" includes error components other than the code-phase error. Accordingly, the pseudo-range error "$\epsilon$" can have various values depending on the magnitude of the error components.

As a result, the inventor determined that it is suitable that the distribution of the pseudo-range error "$\epsilon$" is not assumed to be a normal distribution but is assumed to be a normal mixture distribution into which plural normal distributions are mixed, for example, in the multi-path environment. In this embodiment, two types of models are exemplified as the probability distribution model in which the pseudo-range error "$\epsilon$" is assumed to be a normal mixture distribution.

Figure 7:
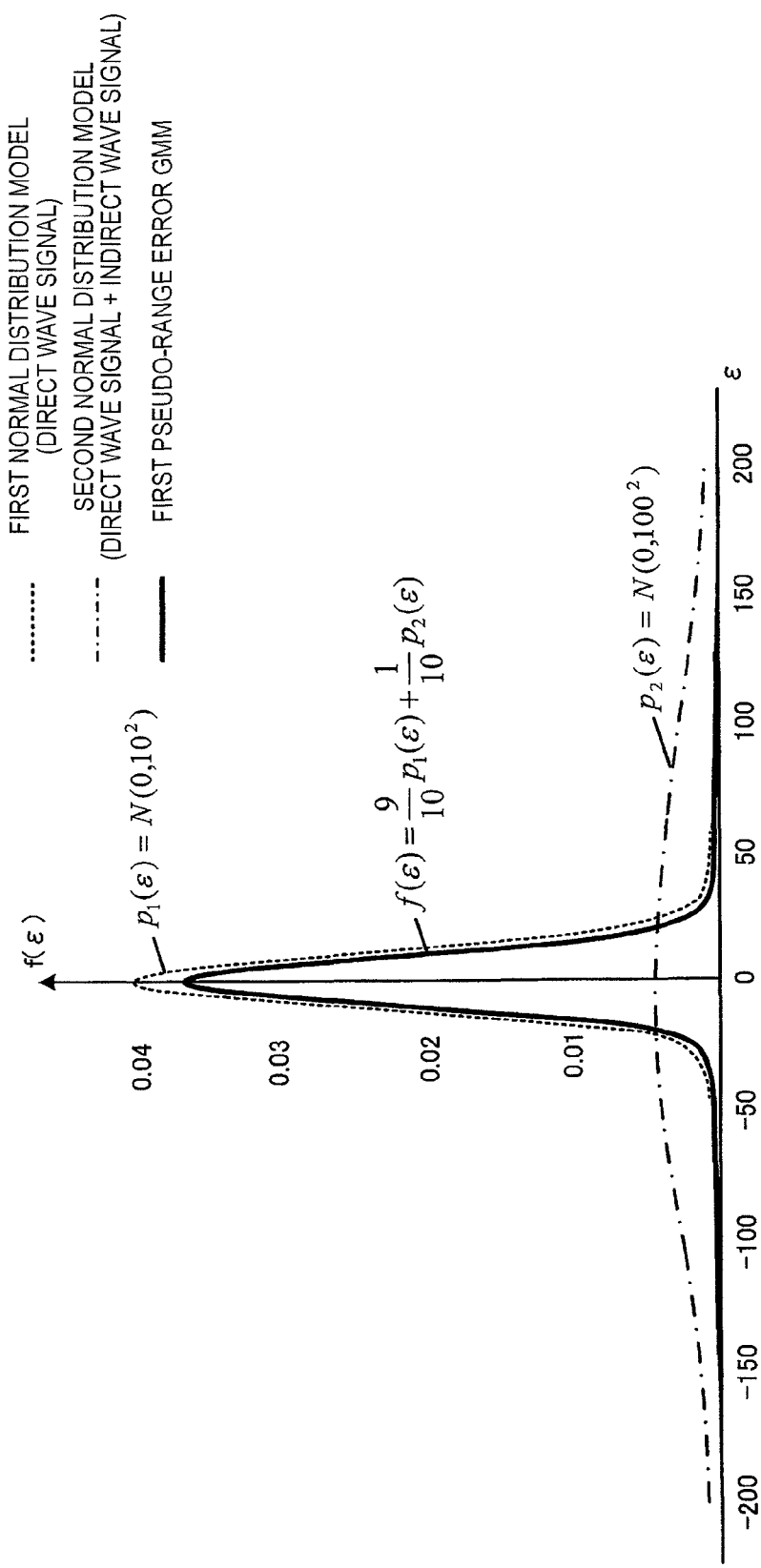
FIG. 7 is a diagram illustrating a first pseudo-range error normal mixture distribution model.

FIG. 7 is a diagram illustrating a first pseudo-range error normal mixture distribution model (first pseudo-range error GMM (Gaussian Mixture Model)) which is an example of the pseudo-range error GMM. The first pseudo-range error GMM "$f(\epsilon)$" is defined as a function in which two types of normal distribution models of a first normal distribution model "$p_1(\epsilon)$" and a second normal distribution model "$p_2(\epsilon)$" are combined. In FIG. 7, the horizontal axis represents the pseudo-range error "$\epsilon$" (of which the units are in meters) and the vertical axis represents the probability density "$f(\epsilon)$" thereof. The first normal distribution model "$p_1(\epsilon)$" is indicated by a dotted line, the second normal distribution model "$p_2(\epsilon)$" is indicated by a one-dot chained line, and the first pseudo-range error GMM "$f(\epsilon)$" is indicated by a bold solid line.

The first normal distribution model "$p_1(\epsilon)$" is a probability distribution model of the pseudo-range error "$\epsilon$" in which it is assumed that the GPS receiver receives a direct wave signal. When there is no influence of an indirect wave signal, the pseudo-range error "$\epsilon$" is expected to have a value around "0 meters". Accordingly, the first normal distribution model "$p_1(\epsilon)$" is modeled as a normal distribution function "$N(0, 10^2)$" in which the pseudo-range error expected value is set to "0 meter" ($\mu_\epsilon=0$) and the pseudo-range error standard deviation is set to "10 meters" ($\sigma_\epsilon=10$) which is a relatively small value.

The second normal distribution model "$p_2(\epsilon)$" is a model function of the pseudo-range error "$\epsilon$" in which it is assumed that the GPS receiver receives a direct wave signal and an indirect wave signal. As described above, the pseudo-range error "$\epsilon$" may have a positive or negative value depending on the positive or negative sign of the code-phase error. Accordingly, the pseudo-range error expected value of the second normal distribution model "$p_2(\epsilon)$" is set to "0 meters" ($\mu_\epsilon=0$) which is the center between positive and negative values. A very great error may be included in the pseudo-range error "$\epsilon$" depending on the magnitude of the code-phase error. Accordingly, the pseudo-range error standard deviation is predicted to be great and is set to "100 meters" ($\sigma_\epsilon=100$). That is, the second normal distribution model "$p_2(\epsilon)$" is modeled by the normal distribution function "$N(0, 100^2)$".

The ratio (combination ratio) at which the first normal distribution model "$p_1(\epsilon)$" and the second normal distribution model "$p_2(\epsilon)$" are mixed is determined as follows. It is thought that the ratio at which the GPS receiver is affected by the multi-path is not usually high. Therefore, it is assumed that the GPS receiver is affected by the multi-path with the probability of 10%, the weight of the first normal distribution model "$p_1(\epsilon)$" is set to "$9/10$" (90%) and the weight of the second normal distribution model "$p_2(\epsilon)$" is set to "$1/10$" (10%). Accordingly, the first pseudo-range error GMM "$f(\epsilon)$" is modeled as a function in which a function obtained by multiplying the first normal distribution model "$p_1(\epsilon)$" by $9/10$ and a function obtained by multiplying the second normal distribution model "$p_2(\epsilon)$" by $1/10$ are mixed (combined).

Figure 8:
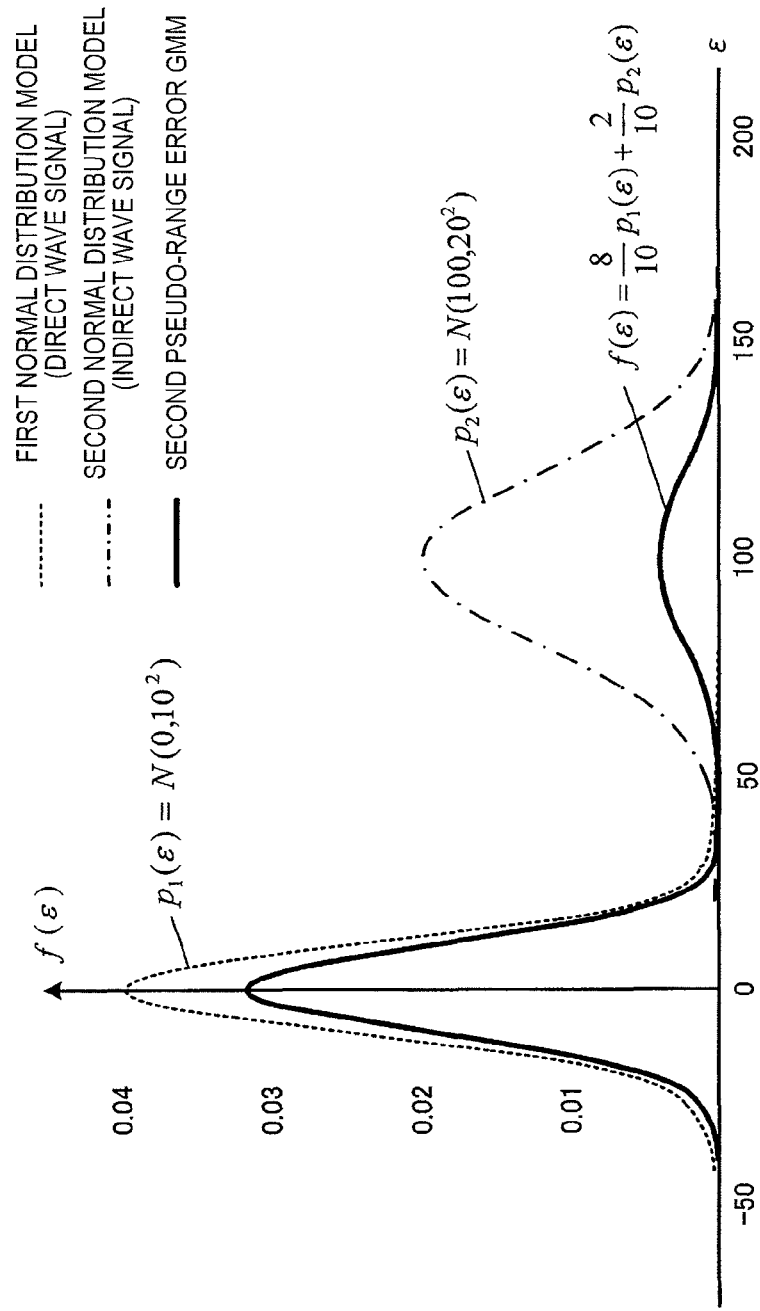
FIG. 8 is a diagram illustrating a second pseudo-range error normal mixture distribution model.

FIG. 8 is a diagram illustrating a second pseudo-range error normal mixture distribution model (second pseudo-range error GMM) which is another example of the pseudo-range error GMM. The second pseudo-range error GMM "$f(\epsilon)$" is a probability density function in which two types of normal distribution models of the first normal distribution model "$p_1(\epsilon)$" and the second normal distribution model "$p_2(\epsilon)$" are mixed (combined), similarly to the first pseudo-range error GMM shown in FIG. 7.

The first normal distribution model "$p_1(\epsilon)$" is modeled as a normal distribution function "$N(0, 10^2)$" which is a model function of the pseudo-range error "$\epsilon$" when it is assumed that the GPS receiver receives a direct wave signal. The second normal distribution model "$p_2(\epsilon)$" is modeled as a normal distribution function "$N(100, 20^2)$" which is a model function of the pseudo-range error "$\epsilon$" when it is assumed that the GPS receiver receives an indirect wave signal in the multi-path environment.

The second pseudo-range error GMM "$f(\epsilon)$" is different from the first pseudo-range error GMM "$f(\epsilon)$" shown in FIG. 7, in that the second normal distribution model "$p_2(\epsilon)$" is not defined as the model function when it is assumed that the GPS receiver receives a direct wave signal and an indirect wave signal but is defined as a model function when it is assumed that the GPS receiver receives only an indirect wave signal. This situation may occur, for example, in an environment in which obstacles such as a tower building are present around the GPS receiver. Since the GPS receiver is not completely opened to the sky, a signal sent out from a GPS satellite is reflected by the obstacles and arrives at the GPS receiver as an indirect wave signal. However, in this environment, a direct wave signal is blocked by the obstacles and does not directly arrive at the GPS receiver. A typical example thereof is an urban canyon environment.

As a result of an experiment carried out by the inventor revealed that there is a tendency that a positive error of about "+100 to +150 meters" is included as the pseudo-range error "$\epsilon$" in the urban canyon environment. Therefore, in the second pseudo-range error GMM "$f(\epsilon)$", the pseudo-range error expected value of the second normal distribution model "$p_2(\epsilon)$" is set to "100 meters" ($\mu_\epsilon=100$) and the pseudo-range error standard deviation is set to "20 meters" ($\sigma_\epsilon=20$). That is, it is modeled as "$p_2(\epsilon)=N(100, 20^2)$".

The combination ratio of the first and second normal distribution models is determined, for example, on the assumption that the GPS receiver is affected by the multi-path with a probability of 20%. That is, the weight of the first normal distribution model "$p_1(\epsilon)$" is set to "$8/10$" (80%) and the weight of the second normal distribution model "$p_2(\epsilon)$" is set to "$2/10$" (20%). Accordingly, the second pseudo-range error GMM "$f(\epsilon)$" is modeled as a function in which a function obtained by multiplying the first normal distribution model "$p_1(\epsilon)$" by $8/10$ and a function obtained by multiplying the second normal distribution model "$p_2(\epsilon)$" by $2/10$ are mixed (combined).

As described above, two types of models of the normal distribution model and the normal mixture distribution model are defined as the probability distribution model having the pseudo-range error "$\epsilon$" as a random variable. When calculating a position, the pseudo-range error normal distribution model and the pseudo-range error normal mixture distribution model are distinguishably used to perform the position calculating operation depending on the positioning environment. The specific position calculating method using the respective probability distribution models will be described below in detail with reference to numerical expressions.

1-1. Use of Pseudo-range Error Normal Distribution Model (Pseudo-range Error GM)

(1) First Position Calculating Method

A first position calculating method is a method of calculating a position using a pseudo-range error normal distribution model and using all the calculation parameters of the state variation vector "$\delta X$" as random variables. In this method, all four calculation parameters "$(\delta x, \delta y, \delta z, \delta h)$" of the state variation vector "$\delta X$" are used as random variables. In this case, the multi-dimensional state variation normal distribution model "$p_{\delta X}^{(m)}(\delta X)$" shown in Expression (8) is a four-dimensional state variation normal distribution model "$P_{\delta X}^{(4)}(\delta X)$".

The maximum likelihood estimation method is a statistical technique of estimating the maximum likelihood of a target parameter for estimation using given observation data on the basis of an index value called likelihood. The likelihood is a scale for expressing the degree, by which a probability model to be used is applicable to observation data, as a probability.

In this embodiment, the likelihood L is expressed by the product of a simultaneous probability of the pseudo-range error "$\delta_k$" (where k=1, 2, . . . , K) of K satellites in the pseudo-range error vector "E" expressed by Expression (6) and the simultaneous probability of four calculation parameters "$\delta X_i=(\delta x, \delta y, \delta z, \delta b)$" (wherein i=1, 2, 3, and 4) of the state variation vector "$\delta X$". That is, the likelihood L is expressed by Expression (9).

$$L = \left[\prod_{k=1}^{K} p_{\varepsilon,k}(\varepsilon_k)\right]\left[\prod_{i=1}^{4} p_{\delta X,i}(\delta X_i)\right] \quad (9)$$

$$= \left[\prod_{k=1}^{K} p_{\varepsilon,k}(\varepsilon_k)\right][p_{\delta X}^{(4)}(\delta X)]$$

In Expression (9), "$p_{\varepsilon,k}(\varepsilon)$" represents the pseudo-range error normal distribution model of the k-th captured satellite. The pseudo-range error normal distribution model "$p_{\varepsilon}(\varepsilon)$" defined in FIG. 2 may be a common model in which parameter values are common to all the captured satellites or may be an individual model in which parameter values vary depending on the captured satellites.

In Expression (9), "$p_{\delta X,i}(\delta X_i)$" represents the state variation normal distribution model of the i-th calculation parameter. When changing the first row to the second row, it is replaced with the four-dimensional state variation normal distribution model "$p_{\delta X}^{(4)}(\delta X)$" providing the simultaneous probabilities of four calculation parameters.

The state variation vector "$\delta X$" maximizing the likelihood L of Expression (9) is acquired as the estimated maximum likelihood solution. Since it is difficult to calculate the estimated maximum likelihood solution using the likelihood L without any change, the calculation is performed using a logarithmic likelihood logL which is a logarithm thereof. The logarithmic likelihood logL is calculated by Expression (10).

$$\log L = \log\left[\prod_{k=1}^{K} p_{\varepsilon,k}(\varepsilon_k)\right][p_{\delta X}^{(4)}(\delta X)] \quad (10)$$

$$= const - \frac{1}{2}\begin{bmatrix}(E-\mu_E)^T W_E(E-\mu_E) + \\ (\delta X - \mu_{\delta X})^T S_{\delta X}^{-1}(\delta X - \mu_{\delta X})\end{bmatrix}$$

$$= const - \frac{1}{2}\begin{bmatrix}(E-\mu_E)^T W_E(E-\mu_E) + \\ (\delta X - \mu_{\delta X})^T W_{\delta X}(\delta X - \mu_{\delta X})\end{bmatrix}$$

In Expression (10), "const" is a constant term. "$\mu_E$" represents the pseudo-range error expected value vector having the expected values "$\mu_{\varepsilon,k}=(\mu_{\varepsilon,1}, \mu_{\varepsilon,2}, \ldots, \mu_{\varepsilon,K})$" of the pseudo-range error "$\varepsilon$" of the K satellites as components and is expressed by Expression (11).

$$\mu_E = \begin{bmatrix}\mu_{\varepsilon,1} \\ \mu_{\varepsilon,2} \\ \vdots \\ \mu_{\varepsilon,K}\end{bmatrix} \quad (11)$$

"$W_E$" represents an inverse pseudo-range error covariance matrix and is calculated as an inverse matrix of a pseudo-range error covariance matrix including covariance values of the pseudo-range error "$\varepsilon_k$" of K satellites. Specifically, the inverse pseudo-range error covariance matrix is expressed by Expression (12).

$$W_E = \begin{bmatrix}\sigma_{\varepsilon,1}^{-2} & 0 & \cdots & 0 \\ 0 & \sigma_{\varepsilon,2}^{-2} & \cdots & 0 \\ \vdots & \ddots & \ddots & \vdots \\ 0 & \cdots & 0 & \sigma_{\varepsilon,K}^{-2}\end{bmatrix} \quad (12)$$

"$\mu_{\delta X}$" represents a state variation expected value vector appearing in Expression (8) and is expressed by Expression (13).

$$\mu_{\delta X} = \begin{bmatrix}\mu_{\delta x} \\ \mu_{\delta y} \\ \mu_{\delta z} \\ \mu_{\delta b}\end{bmatrix} \quad (13)$$

Here, $\mu_{\delta x}, \mu_{\delta y}, \mu_{\delta z}$, and $\mu_{\delta b}$ are expected values of $\delta x, \delta y, \delta z$, and $\delta b$, respectively.

"$S_{\delta X}$" represents a state variation covariance matrix appearing in Expression (8) and is expressed by Expression (14).

$$S_{\delta X} = \begin{bmatrix}\sigma_{xx}^2 & \sigma_{xy}^2 & \sigma_{xz}^2 & \sigma_{xb}^2 \\ \sigma_{yx}^2 & \sigma_{yy}^2 & \sigma_{yz}^2 & \sigma_{yb}^2 \\ \sigma_{zx}^2 & \sigma_{zy}^2 & \sigma_{zz}^2 & \sigma_{zb}^2 \\ \sigma_{bx}^2 & \sigma_{by}^2 & \sigma_{bz}^2 & \sigma_{bb}^2\end{bmatrix} \quad (14)$$

Here, the respective components of 4×4 are covariance values of four components of $\delta x, \delta y, \delta z$, and $\delta b$.

"$W_{\delta X}$" represents an inverse state variation covariance matrix is calculated as an inverse matrix of the state variation covariance matrix "$S_{\delta X}$". Specifically, the inverse state variation covariance matrix is expressed by Expression (15).

$$W_{\delta X} = S_{\delta X}^{-1} \quad (15)$$

To calculate "$\delta X$" maximizing Expression (10), "$d(\log L)/d(\delta X)=0$" has only to be solved. Although the intermediate calculations are skipped, the estimated maximum likelihood solution "$\delta X$" is finally calculated by Expression (16).

$$\delta X = (G^T W_E G + W_{\delta X})^{-1}(G^T W_E(\delta\rho - \mu_E) + W_{\delta X}\mu_{\delta X}) \quad (16)$$

Here, "$\delta\rho$" is a pseudo-range variation vector expressed by Expression (4) and "G" is the geometric matrix expressed by Expression (5).

For each operation time, the estimated maximum likelihood solution of the state variation vector "$\delta X$" is calculated using Expression (16). The state vector "X" is calculated using the calculated estimated maximum likelihood solution of the state variation vector "$\delta X$".

In the position calculating operation in this embodiment, a process of updating the state variation normal distribution model on the result of the previous position calculating operation is performed in addition to the calculation of the estimated maximum likelihood solution. Here, the state variation vector "$\delta X$" at operation time "t" is expressed by "$\delta X(t)$". The state variation expected value vector "$\mu_{\delta X}$" and the state variation covariance matrix "$S_{\delta X}$" at operation time "t" are expressed by "$\mu_{\delta X}(t)$" and "$S_{\delta X}(t)$".

In this case, the state variation expected value vector "$\mu_{\delta X}(t)$" and the state variation covariance matrix "$S_{\delta X}(t)$" are updated using Expressions (17) and (18), respectively.

$$\mu_{\delta X}(t+1) = \delta X(t) \quad (17)$$

$$S_{\delta X}(t+1) = (G^T W_E G + W_{\delta X})^{-1}[G^T W_E G + W_{\delta X} S_{\delta X}(t) W_{\delta X}^T]$$
$$(G^T W_E G + W_{\delta X})^{-1} \quad (18)$$

Expression (17) means that the state variation expected value vector "$\mu_{\delta X}(t+1)$" at the current operation time is updated using the state variation vector "$\delta X(t)$" calculated at the previous operation time. This corresponds to the updating of the variation reference (state variation expected value vector "$\mu_{\delta X}(t)$") of the operation result (state variation vector "$\delta X$") based on the result of the previous position calculating operation. Expression (18) means that the state variation covariance matrix "$S_{\delta X}(t+1)$" at the current operation time is updated using the quantities such as the state variation covariance matrix "$S_{\delta X}(t)$" calculated at the previous operation time.

The state variation expected value vector "$\mu_{\delta X}$" is a vector relevant to the expected value of the state variation normal distribution model. The state variation covariance matrix "$S_{\delta X}$" is a matrix relevant to the standard deviation (covariance) of the state variation normal distribution model. Accordingly, Expressions (17) and (18) can be said to be expressions of updating the state variation normal distribution model on the basis of the result of the previous position calculating operation.

(2) Second Position Calculating Method

A second position calculating method is a method of calculating a position using a normal distribution model as the pseudo-range error "$\epsilon$" and using some calculation parameters of the state variation vector "$\delta X$" as random variables. In this method, some calculation parameters of four calculation parameters "$(\delta x, \delta y, \delta z, \delta b)$" of the state variation vector "$\delta X$" are treated as random variables and the other calculation parameters are treated as non-stochastic variables.

The calculation parameters to be treated as random variables and non-stochastic variables can be appropriately selected depending on the system to be applied. Here, it is assumed that three calculation parameters of "$(\delta x, \delta y, \delta z)$" of the user position variation vector "$\delta P$" are treated as random variables and the clock bias variation "$\delta b$" is treated as a non-stochastic variable. In this case, the multi-dimensional state variation normal distribution model "$p_{\delta X}^{(m)}(\delta X)$" of Expression (8) is changed to a three-dimensional state variation normal distribution model "$p_{\delta X}^{(3)}(\delta X)$".

In this case, since a normal distribution model is not assumed for the clock bias variation "$\delta b$", the logarithmic likelihood "logL" corresponding to Expression (10) is changed to Expression (19).

$$\log L = \log\left[\prod_{k=1}^{K} p_{\varepsilon,k}(\varepsilon_k)\right][p_{\delta X}^{(3)}(\delta X)] \quad (19)$$

$$= const - \frac{1}{2}\left[\begin{array}{l}(E - \mu_E)^T W_E(E - \mu_E) + \\ (\delta X - \mu_{\delta X})^T S_{\delta X}^{-1}(\delta X - \mu_{\delta X})\end{array}\right]$$

$$= const - \frac{1}{2}\left[\begin{array}{l}(E - \mu_E)^T W_E(E - \mu_E) + \\ (\delta X - \mu_{\delta X})^T W_{\delta X}(\delta X - \mu_{\delta X})\end{array}\right]$$

The state variation expected value vector "$\mu_{\delta X}$" defined by Expression (13) is changed to Expression (20).

$$\mu_{\delta X} = \begin{bmatrix} \mu_{\delta x} \\ \mu_{\delta y} \\ \mu_{\delta z} \\ 0 \end{bmatrix} \quad (20)$$

Here, since the clock bias variation "$\delta b$" is treated as a non-stochastic variable, the fourth component corresponding thereto is set to zero.

The state variation covariance matrix "$S_{\delta X}$" defined by Expression (14) is changed to Expression (21).

$$S_{\delta X} = \begin{bmatrix} \sigma_{xx}^2 & \sigma_{xy}^2 & \sigma_{xz}^2 & 0 \\ \sigma_{yx}^2 & \sigma_{yy}^2 & \sigma_{yz}^2 & 0 \\ \sigma_{zx}^2 & \sigma_{zy}^2 & \sigma_{zz}^2 & 0 \\ 0 & 0 & 0 & 0 \end{bmatrix} \quad (21)$$

Here, since the clock bias variation "$\delta b$" is treated as a non-stochastic variable, all the components of the fourth row and the fourth components of the 4×4 matrix are set to zero.

In this case, the estimated maximum likelihood solution "$\delta X$" can be calculated by Expression (16). The state variation expected value vector "$\mu_{\delta X}$" defined by Expression (20) and the state variation covariance matrix "$S_{\delta X}$" defined by Expression (21) are updated by the use of Expressions (17) and (18). In this case, the component corresponding to the clock bias variation "$\delta b$" is zero and is not updated.

A predetermined convergence operation using the received signal is performed on the clock bias variation "$\delta b$" treated as a non-stochastic variable to acquire the solution thereof. Specifically, an approximate solution of the clock bias variation "$\delta b$" is acquired by applying the pseudo-range error normal distribution model to the observation equation of Expression (3) and performing the convergence operation, for example, using a Newton's method. The clock bias variation "$\delta b$" calculated through the convergence operation is used to approximately calculate the pseudo-range in the position calculating operation at the next operation time.

1-2. Use of Pseudo-range Error Normal Mixture Distribution Model (Pseudo-range Error GMM)

(3) Third Position Calculating Method

A third position calculating method is a method of calculating a position using a normal mixture distribution model for the pseudo-range error "$\epsilon$" and using all the calculation parameters of the state variation vector "$\delta X$" as random variables. In this method, all four calculation parameters "$(\delta x, \delta y, \delta z, \delta b)$" of the state variation vector "$\delta X$" are used as random variables. This method is the same as the first position calculating method, except that a normal mixture distribution model instead of the normal distribution model is used as the probability distribution model of the pseudo-range error.

In this case, the logarithmic likelihood "logL" is formulated into Expression (22) by the use of the pseudo-range error GMM "$f(\epsilon)$" and the four-dimensional state variation normal distribution model "$p_{\delta X}^{(4)}(\delta X)$".

$$\log L = \log\left[\prod_{k=1}^{K} f_k(\varepsilon_k)\right]\left[\sum_{i=1}^{4} p_{\delta X,i}(\delta X_i)\right] \quad (22)$$

$$= \log\left[\prod_{k=1}^{K} f_k(\varepsilon_k)\right][p_{\delta X}^{(4)}(\delta X)]$$

In Expression (22), "$f_k(\epsilon_k)$" represents the pseudo-range error GMM of the k-th captured satellite and is generalized by Expression (23).

$$f_k(\varepsilon_k) = \sum_{l=1}^{L} \alpha_l N_l\left[\mu_k^{(l)}, \left(\sigma_k^{(l)}\right)^2\right] \quad (23)$$

$$= \sum_{l=1}^{L} \alpha_l \left[ \frac{1}{\sqrt{2\pi} \, \sigma_k^{(l)}} \exp\left(-\frac{(\varepsilon_k - \mu_k^{(l)})^2}{2(\sigma_k^{(l)})^2}\right) \right]$$

In Expression (23), "l" represents the normal distribution model number to be mixed (combined) and the expression represents that L (where l=1, 2, . . . , L) normal distribution models are mixed. "$\alpha_l$" represents the weight (combination ratio) of the l-th normal distribution model "$N_l$". "$\mu_k^{(l)}$" represents the expected value of the l-th normal distribution model relevant to the k-th captured satellite and "$\sigma_k^{(l)}$" represents the standard deviation of the l-th normal distribution model relevant to the k-th captured satellite.

The pseudo-range error GMM "f(ε)" may be a common model in which parameter values are common to all the captured satellites or may be an individual model in which parameter values vary depending on the captured satellites.

To acquire "δX" maximizing the logarithmic likelihood "logL" of Expression (22), "d(logL)/d(δX)=0" has only to be solved. However, in the normal mixture distribution (GMM), since complicated terms such as addition of logarithms are present, it is difficult to analytically acquire the solution. Therefore, in this embodiment, the estimated maximum likelihood solution is acquired using an EM (Expectation Maximum) algorithm which is a kind of optimization algorithm.

The EM algorithm is a kind of technique of estimating the parameters of the probability distribution model on the basis of the maximum likelihood estimation method. The EM algorithm is a technique used when unmeasurable data (a concealed parameter) is present in addition to measurable data (samples) and the concealed parameter depends on a probability distribution model. The EM algorithm is a kind of repetition method and calculates the estimated maximum likelihood solution by repeatedly performing two steps of an E (Expectation) step of calculating the expected value of a likelihood function relevant to the conditional probability and an M (Maximum) step of calculating the solution maximizing the expected value.

Although intermediate calculations are skipped, the estimated maximum likelihood solution of the state variation vector "δX" is calculated by Expression (24) by applying the EM algorithm.

$$\delta X = \left( G^T \left( \sum_{l=1}^{L} M_l(\delta X_0) \right) G + W_{\delta X} \right)^{-1} \tag{24}$$
$$\left( G^T \left( \sum_{l=1}^{L} M_l(\delta X_0)(\delta \rho - \mu_l) \right) + W_{\delta X} \mu_{\delta X} \right)$$

Here, "$\delta X_0$" represents the initial value of the state variation vector "δX" at each operation time.

"$M_l(\delta X_0)$" in Expression (24) is given by Expression (25).

$$M_l(\delta X_0) = \begin{bmatrix} \frac{h_1^{(l)}(\delta X_0)}{\sigma_1^{(h)}} & 0 & \cdots & 0 \\ 0 & \frac{h_2^{(l)}(\delta X_0)}{\sigma_2^{(h)}} & \cdots & 0 \\ \vdots & \ddots & \ddots & \vdots \\ 0 & \cdots & 0 & \frac{h_K^{(l)}(\delta X_0)}{\sigma_K^{(h)}} \end{bmatrix} \tag{25}$$

"$h_k^{(l)}(\delta X_0)$" in Expression (25) is given by Expression (26).

$$h_k^{(l)}(\delta X_0) = \frac{\alpha_l N_l[\mu_k^{(l)}, (\sigma_k^{(l)})^2]}{\sum_{h=1}^{L} \alpha_h N_h[\mu_k^{(h)}, (\sigma_k^{(h)})^2]} \tag{26}$$

$$= \frac{\alpha_l \left[ \frac{1}{\sqrt{2\pi} \, \sigma_k^{(l)}} \exp\left(-\frac{(\varepsilon_k(\delta X_0) - \mu_k^{(l)})^2}{2(\sigma_k^{(l)})^2}\right) \right]}{\sum_{h=1}^{L} \alpha_h \left[ \frac{1}{\sqrt{2\pi} \, \sigma_k^{(h)}} \exp\left(-\frac{(\varepsilon_k(\delta X_0) - \mu_k^{(h)})^2}{2(\sigma_k^{(h)})^2}\right) \right]}$$

"$\mu_l$" in Expression (24) is given by Expression (27).

$$\mu_l = \begin{bmatrix} \mu_1^{(l)} \\ \mu_2^{(l)} \\ \vdots \\ \mu_K^{(l)} \end{bmatrix} \tag{27}$$

At each operation time, the estimated maximum likelihood solution "δX" is calculated through the use of Expressions (24) to (27). Similarly to the case where the pseudo-range error normal distribution model is applied, the state variation expected value vector "$\mu_{\delta X}$" defined by Expression (13) and the state variation covariance matrix "$S_{\delta X}$" defined by Expression (14) are updated for each operation time.

Specifically, the state variation expected value vector "$\mu_{\delta X}(t)$" and the state variation covariance matrix "$S_{\delta X}(t)$" are updated through the use of Expressions (28) and (29).

$$\mu_{\delta X}(t+1) = \delta X(t) \tag{28}$$

$$S_{\delta X}(t+1) = H(\delta X)(t) F(\delta X)^T H(t)^T \tag{29}$$

"H(δX)" and "F(δX)" in Expression (29) are given by Expressions (30) and (31).

$$H(\delta X) = \left( G^T \left( \sum_{l=1}^{L} M_l(\delta X) \right) G + W_{\delta X} \right)^{-1} \tag{30}$$

$$F(\delta X) = G^T \left( \sum_{l=1}^{L} M_l(\delta X) R_l M_l(\delta X)^T \right) G + W_{\delta X} S_{\delta X}(t) W_{\delta X}^T \tag{31}$$

"$R_l$" in Expression (31) is given by Expression (32).

$$R_l = \begin{bmatrix} \frac{1}{\sigma_1^{(l)}} & 0 & \cdots & 0 \\ 0 & \frac{1}{\sigma_2^{(l)}} & \cdots & 0 \\ \vdots & \ddots & \ddots & \vdots \\ 0 & \cdots & 0 & \frac{1}{\sigma_K^{(l)}} \end{bmatrix} \tag{32}$$

(4) Fourth Position Calculating Method

A fourth position calculating method is a method of calculating a position using a normal mixture distribution model as the pseudo-range error "ε" and using some calculation parameters of the state variation vector "δX" as random variables. In this method, similarly to the second position calculating method, some calculation parameters of four calculation parameters "(δx, δy, δz, δb)" of the state variation vector "δX" are treated as random variables and the other calculation parameters are treated as non-stochastic variables. The fourth position calculating method is different from the second position calculating method, in that a normal mixture distribution model instead of the normal distribution model is used as the probability distribution model of the pseudo-range error.

In this case, the estimated maximum likelihood solution of the state variation vector "δX" can be calculated using the same expressions as used in the third position calculating method. This method is different from the third position calculating method, in that the normal distribution model is applied for only the calculation parameters treated as a random variable. That is, similarly to the second position calculating method, the components corresponding to the calculation parameters treated as a non-stochastic variable out of the components of the state variation vector "δX" are set to zero.

For example, when the clock bias variation "δb" is treated as a non-stochastic variable, the component corresponding to the clock bias variation "δb" is set to zero. The solution of the clock bias variation "δb" is calculated by performing a predetermined convergence operation using the received signal. Specifically, an approximate solution of the clock bias variation "δb" is acquired by applying the pseudo-range error normal mixture distribution model (the pseudo-range error GMM) to the observation equation of Expression (3) and performing the convergence operation, for example, using the EM algorithm. In this case, the clock bias variation "δb" calculated through the convergence operation is used to approximately calculate the pseudo-range in the position calculating operation at the next operation time.

2. Experiment Result

The result of the experiment in which the position calculating operation is performed using the position calculating method according to this embodiment will be described below. An experiment of actually calculating a position by performing the position calculating operation using the technique according to the related art and the technique according to this embodiment was carried out. A position was calculated while causing a user to carry a position calculating device and to walk along a predetermined loop route.

Figure 9:
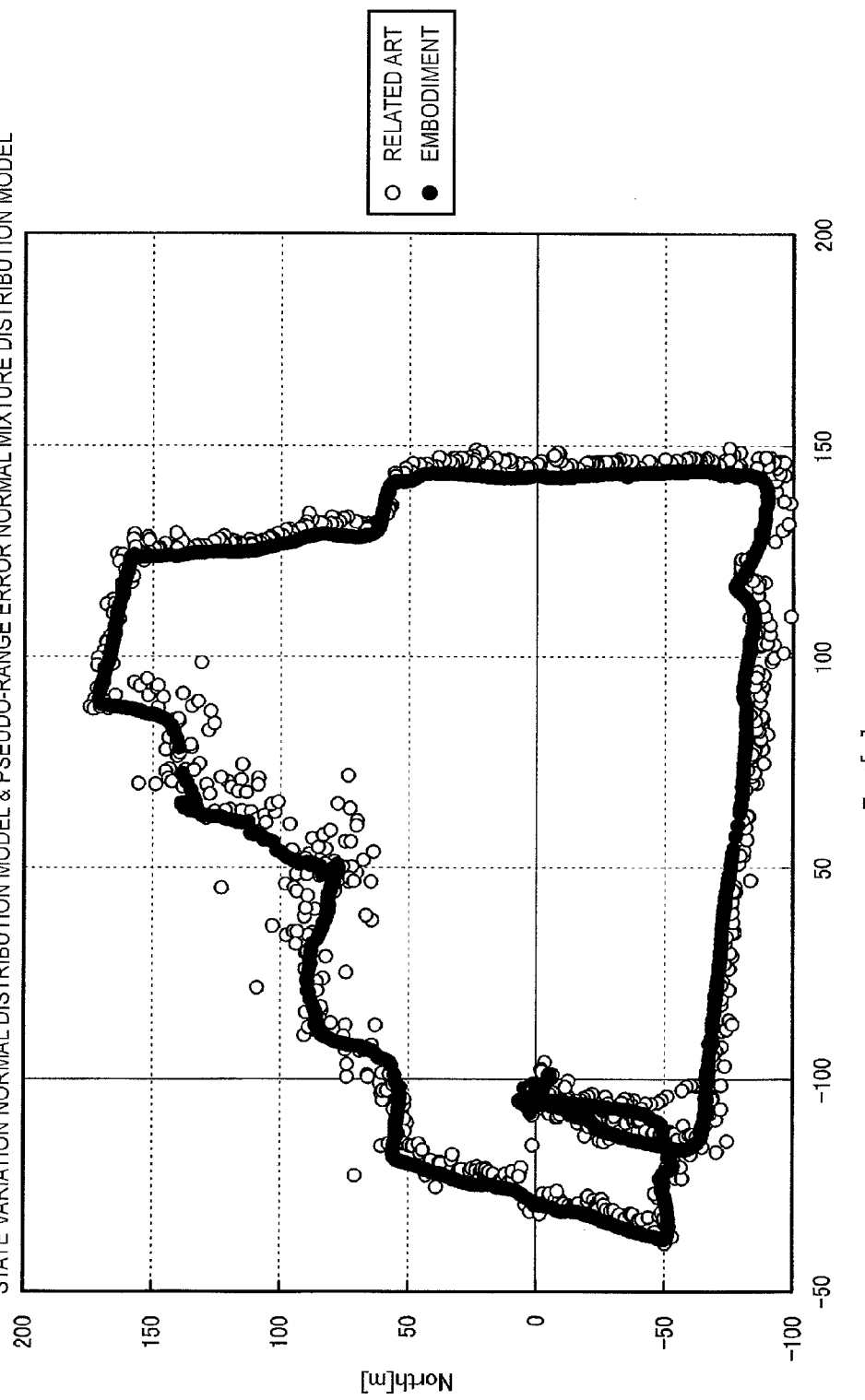
FIG. 9 is a diagram illustrating an example of a position calculation result.

FIG. 9 shows the experiment result illustrating an example of the position calculation result. The horizontal axis of the graph represents the east-west direction and the vertical axis represents the north-south direction. The units thereof are meters (m). The result shown in the drawing is a result in which a normal distribution is used as the probability distribution model of the state variation and a normal mixture distribution model (GMM) is used as the probability distribution model of the pseudo-range error. The locus acquired through the use of the position calculating method according to the related art is indicated by a plot of white circles and the locus acquired through the use of the position calculating method according to this embodiment is indicated by a plot of black circles.

When the position calculating method according to the related art is used, it can be seen from this result that a position error occurs in some places and thus the position is not acquired accurately as much. However, when the position calculated method according to this embodiment is used, it can be seen that a smooth locus along the loop route is acquired. By performing the position calculating operation with a temporal correlation given to the operation results instead of independently using the results of the position calculating operation, the continuity of the calculated position is dramatically improved.

Figure 10:
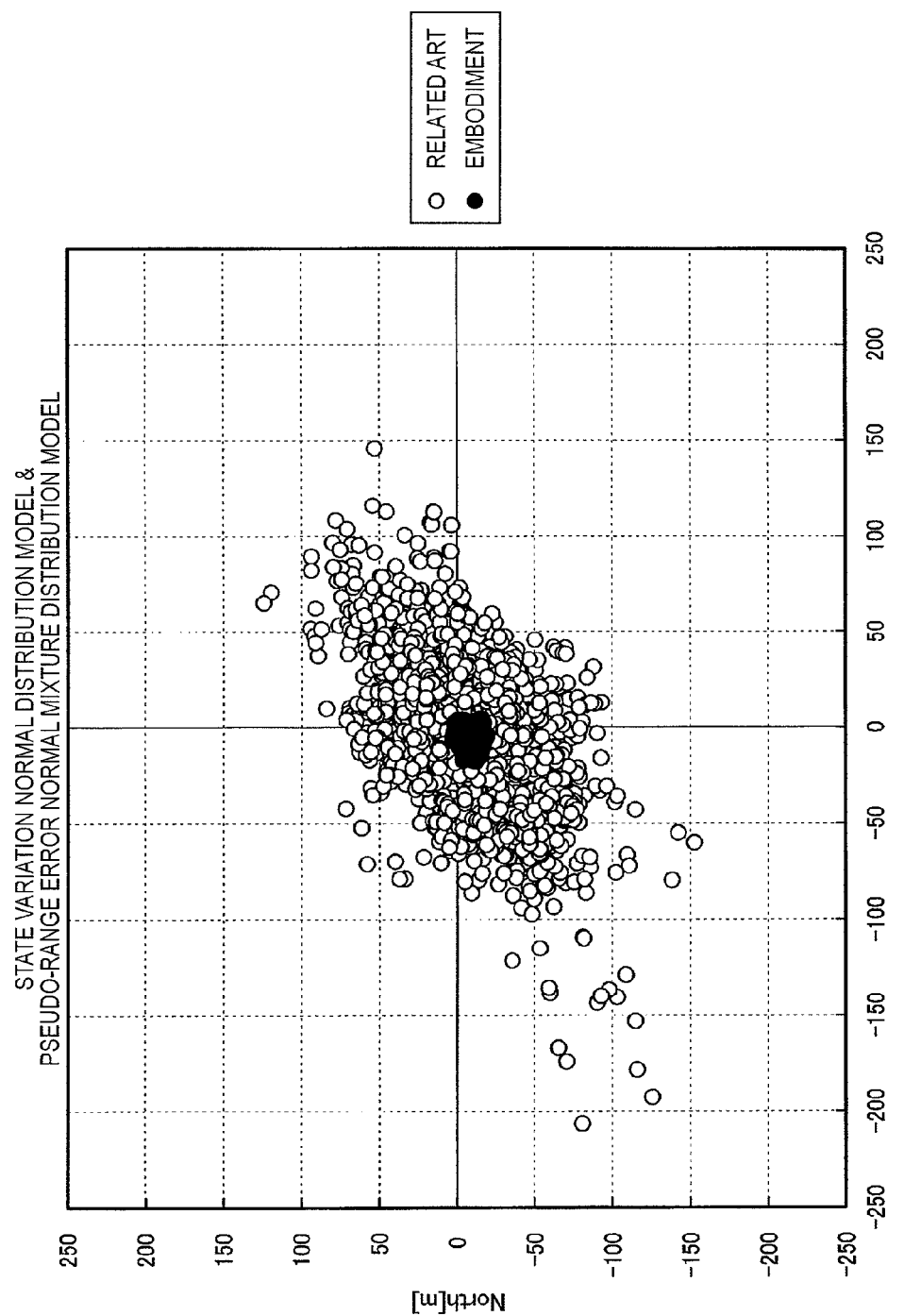
FIG. 10 is a diagram illustrating another example of the position calculation result.

FIG. 10 is a graph of position calculation accuracy in the walking experiment. The horizontal axis of the graph represents the position error in the east-west direction and the vertical axis represents the position error in the north-south direction. The units thereof are meters (m). The center of the graph corresponds to the position error "0 (meter)" and the position calculation accuracy becomes higher as the plot goes closer to the center of the graph.

When the position calculating method according to the related art is used, it can be seen from this graph that the plot is spread widely as a whole and the position calculation accuracy is lowered. On the contrary, when the position calculating method according to this embodiment is used, it can be seen that the plot is concentrated on the central part as a whole and the position calculation accuracy is markedly improved in comparison with the method according to the related art.

Figure 11:
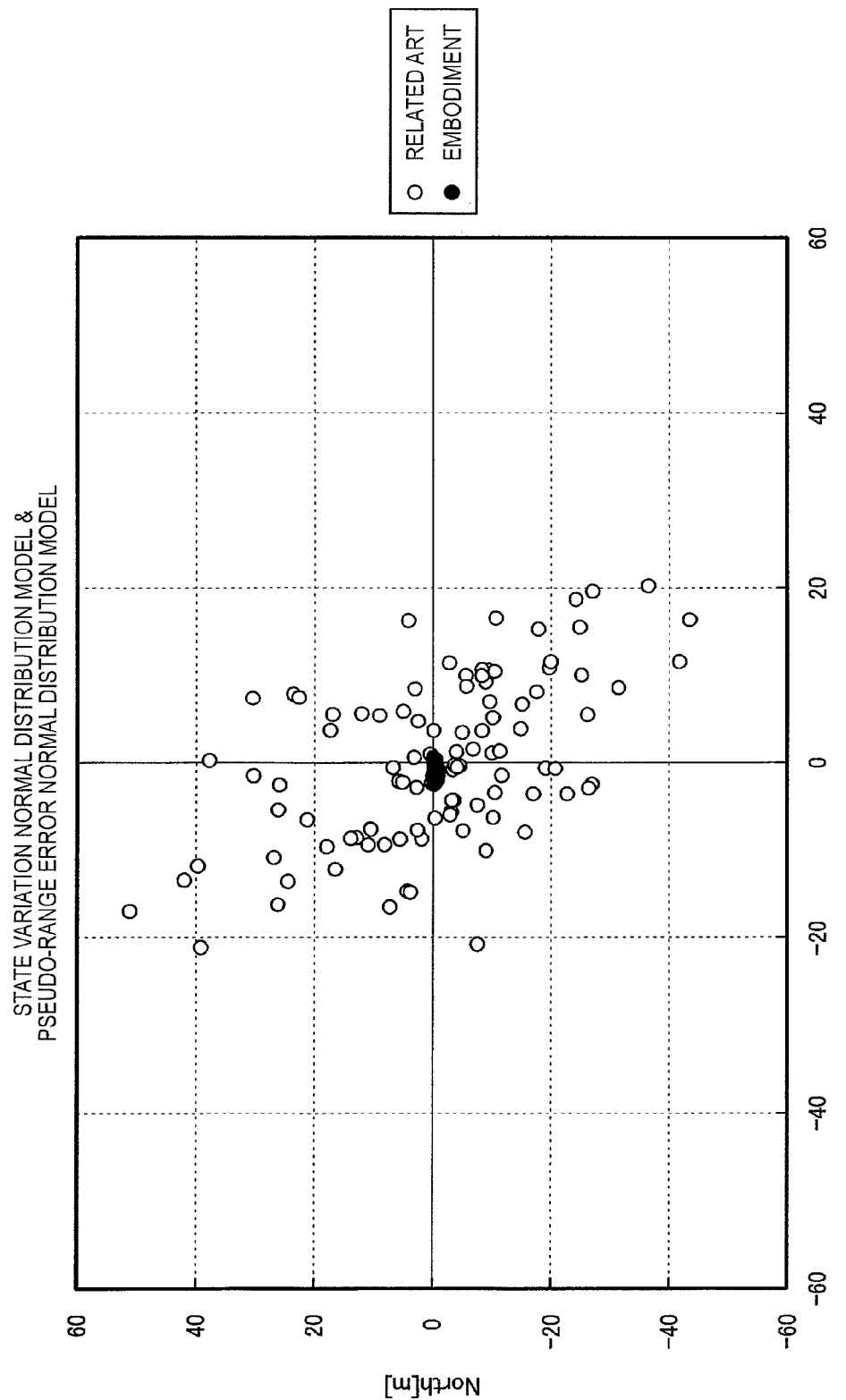
FIG. 11 is a diagram illustrating another example of the position calculation result.

FIG. 11 shows an example of another experiment result illustrating the position calculation accuracy. The result shown in the drawing is a result in which normal distribution models are used as both the probability distribution model of the state variation and the probability distribution model of the pseudo-range error. The way of viewing the drawing is the same as shown in FIG. 10. When a normal distribution model is used as the probability distribution model of the pseudo-range error, it can be seen from the result that the plot indicating the position error is concentrated on the central part of the graph and thus the position calculation accuracy is markedly improved.

From the above-mentioned experiment results, it was proved that the position calculation accuracy is improved by using the position calculating method according to this embodiment.

3. Examples

An example of the position calculating device calculating a position using the position calculating method will be described below. Here, a mobile phone is assumed as an example of an electronic apparatus having the position calculating device. The example to which the invention can be applied is not limited to the examples to be described below.

3-1. Configuration of Mobile Phone

Figure 12:
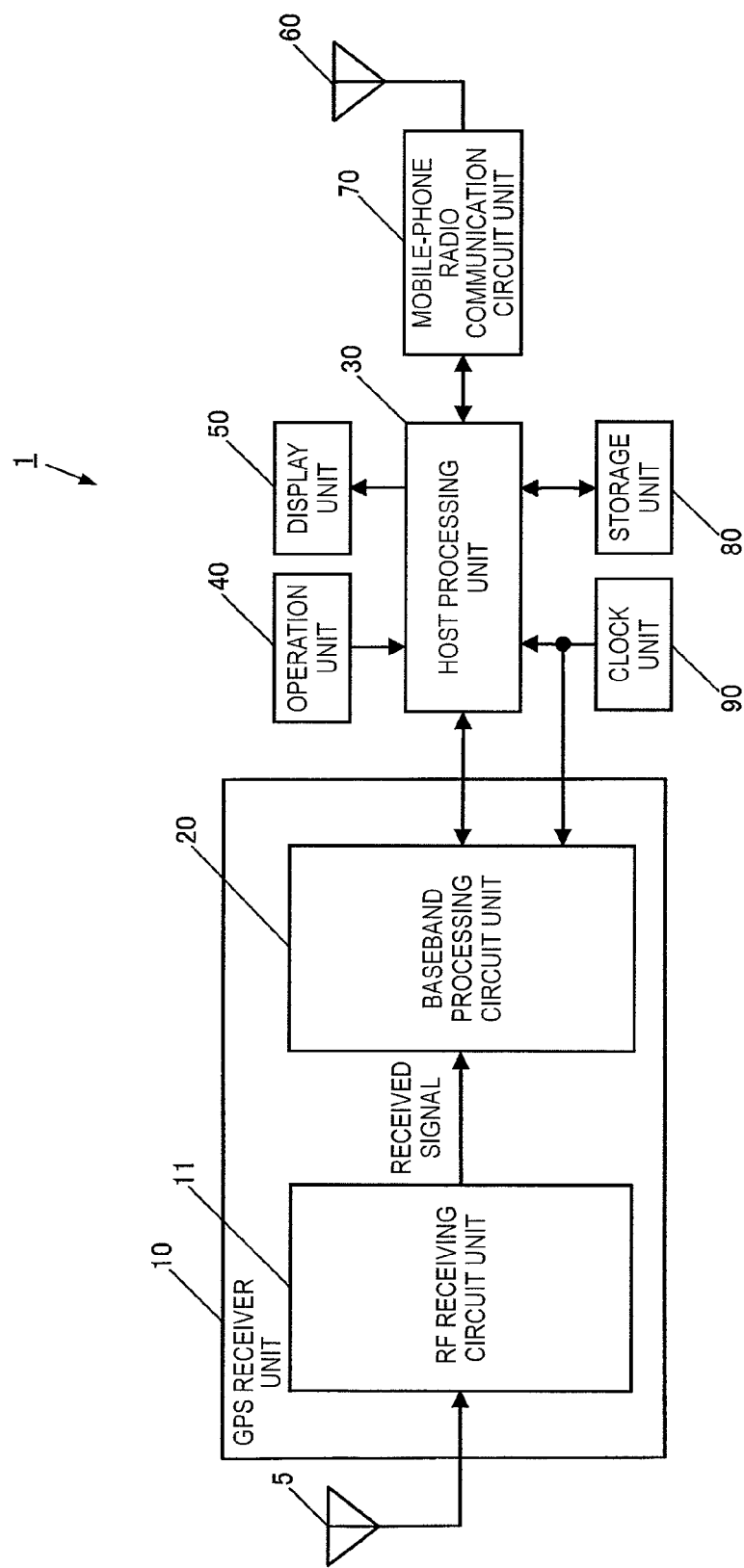
FIG. 12 is a block diagram illustrating the functional configuration of a mobile phone.

FIG. 12 is a block diagram illustrating a function configuration of a mobile phone 1. The mobile phone 1 includes a GPS antenna 5, a GPS receiver unit 10, a host processing unit 30, an operation unit 40, a display unit 50, a mobile phone antenna 60, a mobile phone radio communication circuit unit 70, a storage unit 80, and a clock unit 90.

The GPS antenna 5 is an antenna receiving RF (Radio Frequency) signals including GPS satellite signals sent out from GPS satellites and outputs the received signals to the GPS receiver unit 10.

The GPS receiver unit 10 is a circuit or a unit calculating the position of the mobile phone 1 on the basis of the signals output from the GPS antenna 5 and is a functional block corresponding to the GPS receiver. In this example, the GPS receiver unit 10 corresponds to the position calculating device.

The GPS receiver unit 10 includes an RF receiving circuit unit 11 and a baseband processing circuit unit 20. The GPS receiver unit 10 corresponds to a receiver unit receiving the GPS satellite signals. The RF receiving circuit unit 11 and the baseband processing circuit unit 20 may be constructed by different LSI (Large Scale Integration) chips or a single chip.

The RF receiving circuit unit 11 is an RF signal receiving circuit. Regarding the circuit configuration, a receiving circuit of converting an RF signal output from the GPS antenna 5 into a digital signal through the use of an A/D converter and processing the digital signal may be constructed. Alternatively, a circuit of processing an RF signal output from the GPS antenna 5 as an analog signal, finally the processed signal into a digital signal through the use of an A/D converter, and outputting the digital signal to the baseband processing circuit unit 20 may be constructed.

In the latter, for example, the RF receiving circuit unit 11 can be constructed as follows. That is, an RF signal-multiplication oscillation signal is generated by dividing or multiplying a predetermined oscillation signal. Then, the RF signal output from the GPS antenna 5 is multiplied by the generated oscillation signal to convert down the RF signal into an intermediate frequency signal (hereinafter, referred to as an "IF (Intermediate Frequency) signal"), the IF signal is amplified or the like, the amplified signal is converted into a digital signal through the use of an A/D converter, and the digital signal is output to the baseband processing circuit unit 20.

The baseband processing circuit unit 20 performs a carrier removing process or a correlation operation on the received signal output from the RF receiving circuit unit 11 to capture a GPS satellite signal. Then, the position and the clock error of the mobile phone 1 is calculated using time information or satellite orbit information extracted from the GPS satellite signal.

The host processing unit 30 is a processor collectively controlling the units of the mobile phone 1 in accordance with various programs such as a system program stored in the storage unit 80 and includes a processor such as a CPU (Central Processing Unit). The host processing unit 30 displays a map having the current position on the display unit 50 on the basis of the position coordinate acquired from the baseband processing circuit unit 20 or uses the position coordinate for various application processes.

The operation unit 40 is an input device constructed, for example, by a touch panel or button switches and outputs a signal of a pressed key or button to the host processing unit 30. Various instructions such as the request for calls, the request for transmission and reception of mails, and the request for calculation of a position are input by the operation on the operation unit 40.

The display unit 50 is a display device which is constructed by an LCD (Liquid Crystal Display) or the like and which displays a variety of information based on a display signal input from the host processing unit 30. The display unit 50 displays a position display picture, time information, or the like.

The mobile phone antenna 60 is an antenna transmitting and receiving mobile-phone radio signals to and from a radio base station provided by a communication service provider of the mobile phone 1.

The mobile-phone radio communication circuit unit 70 is a communication circuit unit of a mobile phone including an RF conversion circuit and a baseband processing circuit and realizes calls or transmission and reception of mails by modulating and demodulating the mobile-phone radio signals.

The storage unit 80 includes a storage device such as a ROM (Read Only Memory), a flash ROM, and a RAM (Random Access Memory) and stores a system program allowing the host processing unit 30 to control the mobile phone 1, various programs for performing various application processes, or data.

The clock unit 90 is an internal clock of the mobile phone 1 and includes a crystal oscillator including a quartz vibrator and an oscillation circuit. The counted time of the clock unit 90 is frequently output to the baseband processing circuit unit 20 and the host processing unit 30. The clock unit 90 is calibrated using the clock error calculated by the baseband processing circuit unit 20.

3-2. Configuration of Baseband Processing Circuit Unit

Figure 13:
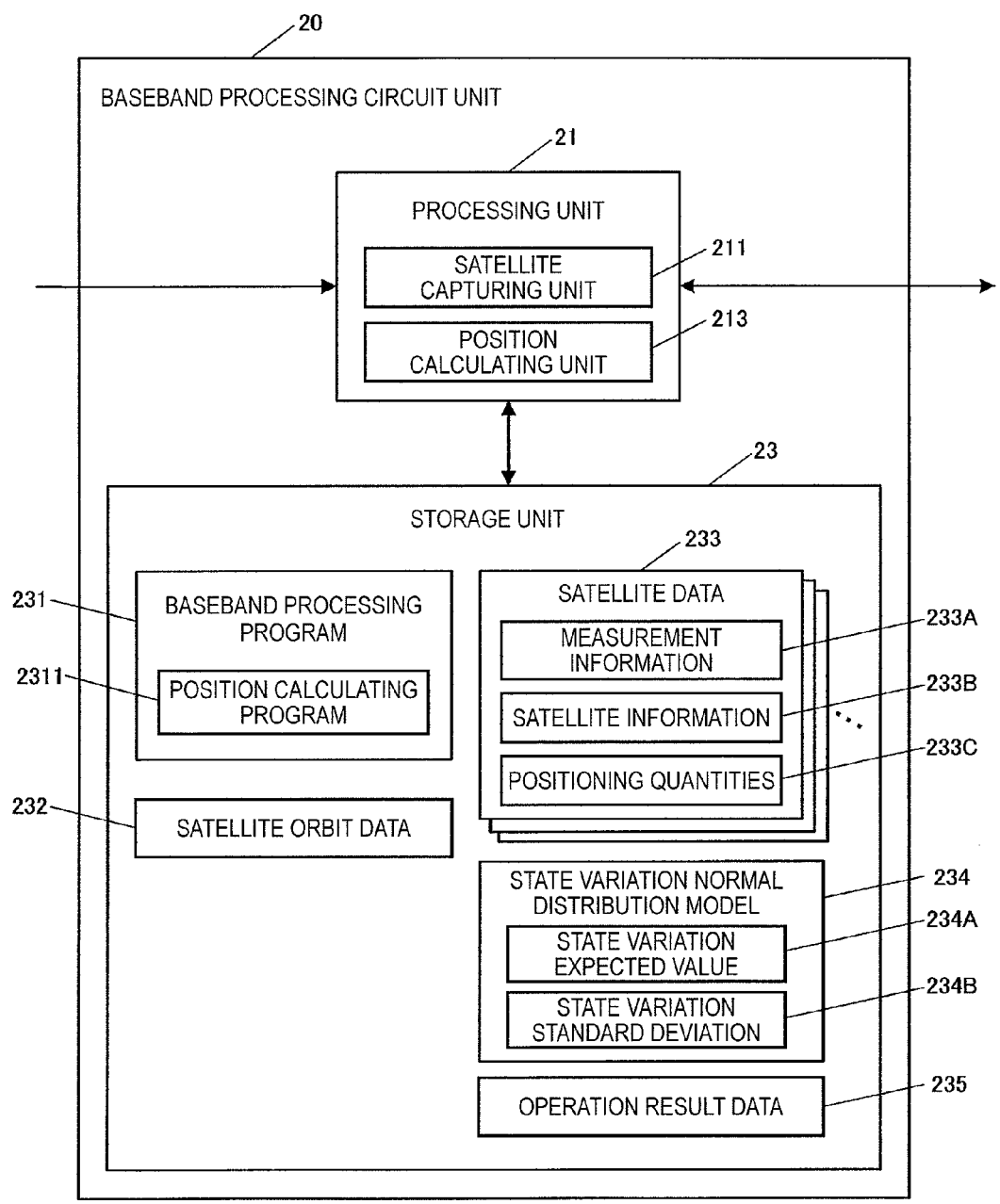
FIG. 13 is a diagram illustrating the circuit configuration of a baseband processing circuit unit.

FIG. 13 is a diagram illustrating the circuit configuration of the baseband processing circuit unit 20 and the data configuration of the storage unit 23. The baseband processing circuit unit 20 includes a processing unit 21 and a storage unit 23 as main functional units.

The processing unit 21 is an arithmetic and control unit collectively controlling the functional units of the baseband processing circuit unit 20 and includes a processor such as a CPU or a DSP (Digital Signal Processor). The processing unit 21 includes a satellite capturing unit 211 and a position calculating unit 213 as functional units.

The satellite capturing unit 211 is a functional unit capturing a GPS satellite. Specifically, the satellite capturing unit 211 performs a carrier removing process and a digital signal process of a correlation operation on the digitalized received signal output from the RF receiving circuit unit 11 to capture a GPS satellite. The satellite capturing unit 211 performs a peak determining process on the correlation operation result and acquires information such as the Doppler frequency of the received carrier signal or the code-phase of the received C/A code as measurement information.

The satellite capturing unit 211 decodes navigation data on the basis of the correlation operation result. When the phase (carrier-phase) of the received carrier signal and the phase (code-phase) of the received C/A code are detected and correlated with each other, the satellite capturing unit 211 can decode bit values constituting the navigation data on the basis of the temporal variation of the correlation value. The phase synchronization is performed, for example, through a PLL known as a phase locked loop.

The position calculating unit 213 performs the position calculating operation on the basis of the above-mentioned principles using the measurement information relevant to the GPS satellites captured by the satellite capturing unit 211 or the quantities such as the navigation data, the time information, and the satellite information and calculates the position (position coordinate) and the clock error (clock bias) of the mobile phone 1. The position calculating unit 213 outputs the calculated position to the host processing unit 30 and calibrates the clock unit 90 on the basis of the calculated clock error.

The position calculating unit 213 corresponds to the position calculating unit that performs the position calculating operation which is an operation using the received signal received by the GPS receiver unit 10 and which is determined on the basis of a given probability distribution model having at least the variation in the operation result as a random variable.

The storage unit 23 stores a system program of the baseband processing circuit unit 20, various programs for performing various functions such as a satellite capturing function and a position calculating function, data, and the like. The storage unit 23 includes a work area for temporarily storing data in process, process result, and the like of various processes.

The storage unit 23 stores a first baseband processing program 231, which is read and executed as a baseband process (see FIG. 14) by the processing unit 21, as a program. The baseband processing program 231 includes as a sub routine a position calculating program 2311 which is executed as various position calculating processes (see FIGS. 15 to 18). A program corresponding to any one of the first to fourth position calculating methods described in the principles is stored as the position calculating program 2311.

The storage unit 23 stores satellite orbit data 232, individual satellite data 233 relevant to the respective captured GPS satellites, a state variation normal distribution model 234, and operation result data 235 as significant data.

The satellite orbit data 232 is data such as an almanac including rough satellite orbit information of all the GPS satellites or an ephemeris including detailed satellite orbit information for the respective GPS satellites. The satellite orbit data 232 is acquired by decoding GPS satellite signals received from the GPS satellites and is also acquired as assist data, for example, from a base station of the mobile phone 1 or an assist server.

The individual satellite data 233 includes measurement information 233A, satellite information 233B, and positioning calculation quantities 233C. The measurement information 233A is information such as the code-phase, the received frequency, or the Doppler frequency of a GPS satellite signal measured for the corresponding captured satellite. The satellite information 233B is information such as the position, the velocity, and the moving direction of the captured satellite. The positioning calculation quantities 233C are various quantities used to perform the positioning calculation in accordance with the above-mentioned principles.

The state variation normal distribution model 234 is the state variation normal distribution model shown and described in FIG. 1 and includes, for example, a state variation expected value 234A and a state variation standard deviation 234B as model parameter values. The state variation normal distribution model is updated for each operation time.

The operation result data 235 is data acquired as the result of the position calculating operation and includes the position vector "P" and the clock bias "b" of the mobile phone 1.

3-3. Flow of Processes

Figure 14:
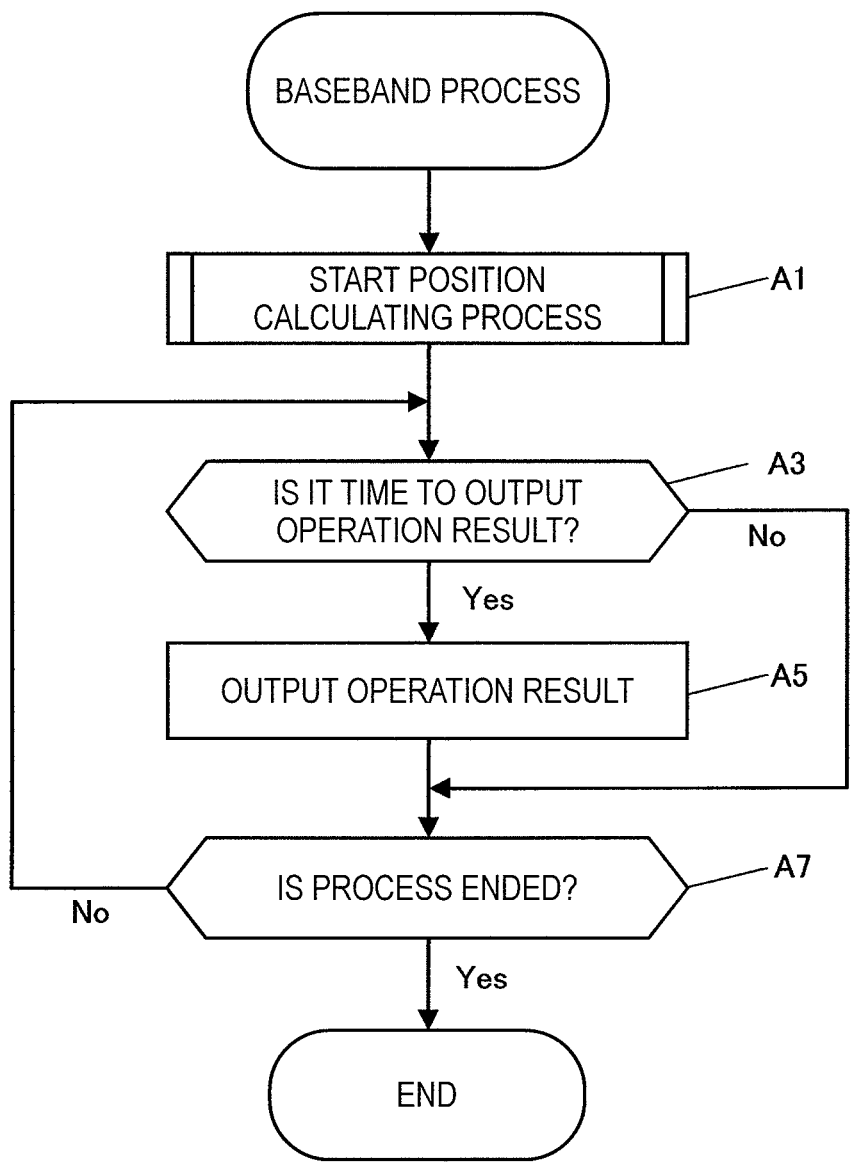
FIG. 14 is a flowchart illustrating the flow of a baseband process.

FIG. 14 is a flowchart illustrating the flow of the baseband process which is performed by the baseband processing circuit unit 20 by allowing the processing unit 21 to read the baseband processing program 231 stored in the storage unit 23.

First, the processing unit 21 starts the position calculating process in accordance with the position calculating program 2311 stored as a sub routine in the storage unit 23 (step A1). The position calculating process is any one of the first to fourth position calculating processes shown in FIGS. 15 to 18.

Subsequently, the processing unit 21 determines whether it is time to output the operation result (step A3). The time to output the operation result can be set arbitrarily. For example, the time with the same time interval as the time interval of the position calculating operation may be set or the time with a time interval longer than the time interval of the position calculating operation may be set. The time at which it is instructed to output the operation result by a user may be set as the output time.

When it is determined that it is time to output the operation result (Yes in step A3), the processing unit 21 outputs the newest operation result to the host processing unit 30 (step A5). When it is determined in step A3 that it is not time to output the operation result (No in step A3) or after step A5, the processing unit 21 determines whether baseband process should be ended (step A7).

When it is determined that the baseband process should not be ended (No in step A7), the processing unit 21 performs again the process of step A3. When it is determined that the baseband process should be ended (Yes in step A7), the processing unit 21 ends the baseband process.

Figure 15:
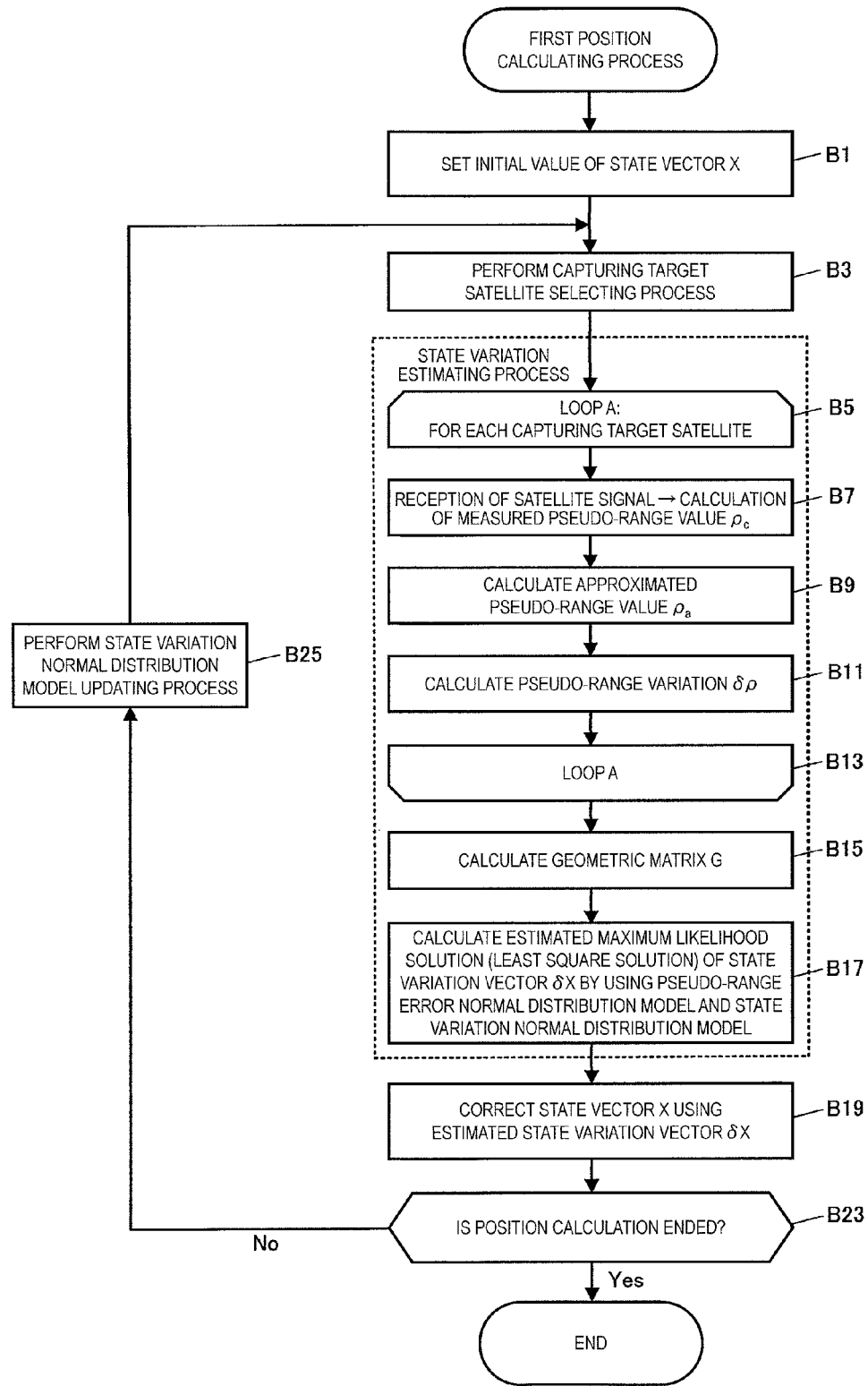
FIG. 15 is a flowchart illustrating the flow of a first position calculating process.

FIG. 15 is a flowchart illustrating the flow of a first position calculating process corresponding to the first position calculating method. First, the processing unit 21 sets the initial value of the state vector "X" (step B1). Specifically, a position (base station position) acquired from the base station of the mobile phone 1 through the server assist or a predetermined position (for example, a fixed value) is set as the initial position. The clock bias "b" is set to a predetermined initial value (for example, a fixed value).

Subsequently, the processing unit 21 performs a capturing target satellite selecting process (step B3). Specifically, a GPS satellite located in the sky at the initial position at the current time counted by the clock unit 90 is determined and selected as a capturing target satellite using the satellite orbit data 232 such as the almanac or the ephemeris stored in the storage unit 23.

Then, the processing unit 21 performs a state variation estimating process (steps B5 to B17). Specifically, the processing unit 21 performs the processes of loop A on the respective capturing target satellites (steps B5 to B13). In loop A, the processing unit 21 receives a GPS satellite signal from the capturing target satellite, measures the pseudo-range, and sets the measured value as a measured pseudo-range value "$\rho_c$" (step B7). The measured pseudo-range value "$\rho_c$" can be calculated using the code-phase which can be acquired as the result of phase search.

The processing unit 21 calculates an approximated pseudo-range value "$\rho_a$" (step B9). Specifically, the processing unit 21 calculates the approximated pseudo-range value as "$\rho_a = \|P_k - P\| + b$" using the position vector "$P_k$" of the capturing target satellite acquired from the satellite orbit data 232 and the newest position vector "P" and the newest clock bias "b" of the mobile phone 1. In this expression, the unit of the clock bias "b" is converted into a distance.

Thereafter, the processing unit 21 calculates a pseudo-range variation "$\delta\rho$" (step B11). Specifically, the processing unit 21 calculates the difference between the measured pseudo-range value "$\rho_c$" measured in step B7 and the approximated pseudo-range value "$\rho_a$" calculated in step B9 and sets the calculated difference as the pseudo-range variation "$\delta\rho$". Then, the processing unit 21 performs the processes on the next capturing target satellite. After performing the processes of steps B7 to B11 on all the capturing target satellites, the processing unit 21 ends loop A (step B13).

Subsequently, the processing unit 21 calculates a geometric matrix G (step B15). Specifically, the processing unit 21 calculates an line-of-sight vector "l" directed from the mobile phone 1 to the respective capturing target satellites using the satellite position vector of the respective capturing target satellites acquired from the satellite orbit data 232 and the newest position vector of the mobile phone 1. Then, the processing unit calculates the geometric matrix G expressed by Expression (5).

Thereafter, the processing unit 21 uses the pseudo-range error normal distribution model and the state variation normal distribution model to calculate the estimated maximum likelihood solution of the state variation "$\delta X$" (step B17). Specifically, the processing unit 21 calculates the state variation "$\delta X$" using Expression (16). Since the pseudo-range error "$\epsilon$" is assumed to be a normal distribution, the acquired estimated maximum likelihood solution corresponds to the least-square solution. Then, the processing unit 21 ends the state variation estimating process.

Subsequently, the processing unit 21 corrects the state vector "X" using the state variation vector "$\delta X$" estimated as the estimated maximum likelihood solution in step B17 (step B19). Specifically, the processing unit 21 newly calculates the state vector "X" at the current operation time by adding the state variation vector "δX" acquired as the estimated maximum likelihood solution to the newest state vector "X".

Thereafter, the processing unit 21 determines whether the position calculation should be ended (step B23), and performs a state variation normal distribution model updating process (step B25) when it is determined that the position calculation should not be ended yet (No in step B23). Specifically, the processing unit 21 updates the state variation expected value vector "$\mu_{\delta X}$" and the state variation covariance matrix "$S_{\delta X}$" using Expressions (17) and (18), respectively.

After performing the state variation normal distribution model updating process, the processing unit 21 performs the position calculating operation at the next operation time again in step B3. When it is determined in step B23 that the position calculation should be ended (Yes in step B23), the processing unit 21 ends the first position calculating process.

The processes of steps B3 to B25 correspond to the position calculating operation at one operation time. The first position calculating process is characterized in that a convergence operation is excluded from the position calculating operation for each operation time. In the position calculating operation according to the related art, when a solution is calculated using the least-square method, an approximated solution is calculated by performing the convergence operation, for example, using the Newton's method. However, in this embodiment, since the variation in the operation result is used as a random variable and the probability distribution model is updated for each operation time, the convergence operation is not necessary.

Figure 16:
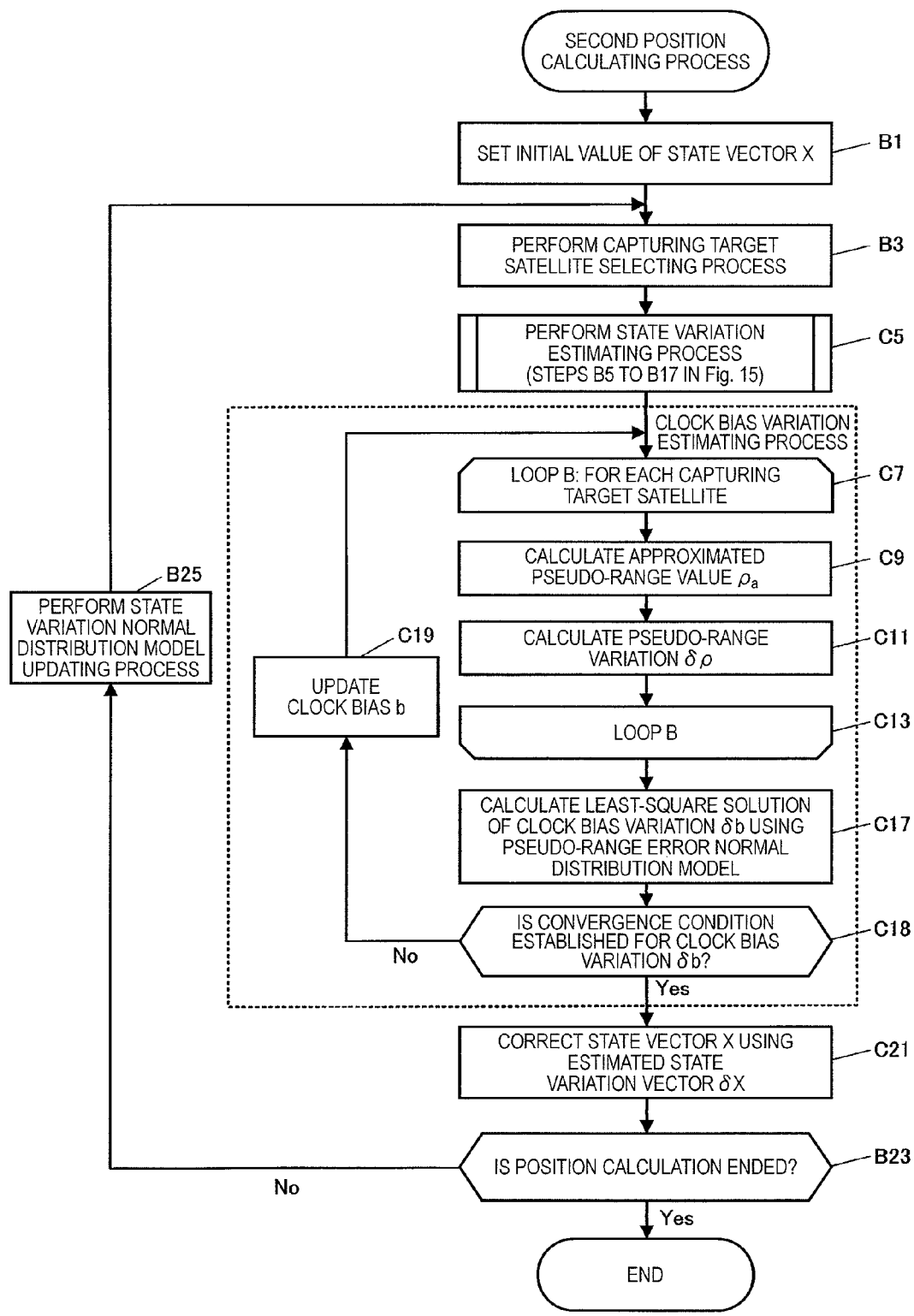
FIG. 16 is a flowchart illustrating the flow of a second position calculating process.

FIG. 16 is a flowchart illustrating the flow of a second position calculating process corresponding to the second position calculating method. In this flowchart, a position is calculated using the components "δx, δy, and δz" of the position variation vector "δP" as random variables and using the clock bias variation "δb" as a non-stochastic variable in the state variation vector "δX". The same steps as performed in the first position calculating process of FIG. 15 are referenced by the same reference signs and description thereof is not be repeated.

The processing unit 21 performs a state variation estimating process (step C5) after performing the capturing target satellite selecting process in step B3. Specifically, the processing unit 21 performs the same process as the state variation estimating process (steps B5 to B17) of the first position calculating process. Here, since the clock bias "δb" is used as a non-stochastic variable, the component corresponding to the clock bias variation "δb" of the state variation vector "δX" is set to zero. That is, the state variation estimating process becomes a position variation estimating process of estimating the position variation vector "δP".

In the state variation estimating process, the approximated pseudo-range value "$\rho_a$" is calculated using the value of the clock bias "b" calculated through the convergence operation in the previous position calculating operation (step B9). Specifically, the approximated pseudo-range value "$\rho_a = \|P_k - P\| + b$" is calculated using the position vector "$P_k$" of the capturing target satellite acquired from the satellite orbit data 232, the position vector "P" calculated through the previous position calculating operation, and the clock bias "b" calculated through the convergence operation in the previous position calculating operation. This corresponds to performing the position calculating operation using the values of predetermined parameters calculated through the previous convergence operation.

The processing unit 21 performs a clock bias variation estimating process (steps C7 to C19). The clock bias variation estimating process is a process of performing a predetermined convergence operation using the received signal of a GPS satellite signal to calculate the approximated solution of the clock bias variation "δb" as a non-stochastic variable.

Specifically, the processing unit 21 performs the processes of loop B on the respective capturing target satellites (steps C7 to C13). In loop B, the processing unit 21 calculates the approximated pseudo-range value "$\rho_a$" (step C9). Then, the processing unit 21 calculates the pseudo-range variation "δρ" (step C11). Specifically, the difference between the measured pseudo-range value "$\rho_c$" measured in step B7 of the state variation estimating process and the approximated pseudo-range value "$\rho_a$" calculated in step C9 is calculated and is set as the pseudo-range variation "δρ".

Thereafter, the processing unit 21 changes the flow of processes to the next capturing target satellite. After performing the processes of steps C9 and C11 on all the capturing target satellites, the processing unit 21 ends the processes of loop B (step C13).

Then, the processing unit 21 calculates the least-square solution of the clock bias variation "δb" using a pseudo-range error normal distribution model (step C17). The processing unit 21 determines whether a predetermined convergence condition is established for the calculated clock bias variation "δb" (step C18). Specifically, for example, when the absolute value of the difference between the clock bias variation "δb" calculated in the current repetition steps and the clock bias variation "δb" calculated in the previous repetition steps is smaller than a predetermined threshold value, it is determined that the convergence condition is established.

When it is determined that the convergence condition is not established (No in step C18), the processing unit 21 corrects and updates the clock bias "b" using the clock bias variation "δb" calculated in step C17 (step C19). The processing unit 21 performs the process of step C7 again. When it is determined that the convergence condition is established (Yes in step C18), the processing unit 21 ends the clock bias variation estimating process.

Thereafter, the processing unit 21 sets the state variation vector "δX" using the position variation vector "δP" estimated in the state variation estimating process and the clock bias variation "δb" estimated in the clock bias variation estimating process and corrects the state vector "X" using the state variation vector (step C21). That is, the processing unit 21 newly calculates the state vector "X" at the current operation time by adding the state variation vector "δX" to the newest state vector "X".

Thereafter, the processing unit 21 determines whether the position calculation should be ended (step B23), and performs a state variation normal distribution model updating process (step B25) when it is determined that the position calculation should not be ended yet (No in step B23). Thereafter, the processing unit 21 performs the position calculating operation at the next operation time in step B3 again. When it is determined in step B23 that the position calculation should be ended (Yes in step B23), the processing unit 21 ends the second position calculating process.

In this case, the processes of steps B3 to B25 correspond to the position calculating operation at one operation time. The repetition steps of steps C7 to C19 correspond to the predetermined convergence operation using the received signal. The second position calculating process is characterized in that the convergence operation is excluded for the position variation vector "δP" treated as a random variable but the convergence operation is not excluded for the clock bias variation "δb" treated as a non-stochastic variable. Since the clock bias variation "δb" is not treated as a random variable but is treated as a complete unknown, the optimal solution is not calculated without performing the convergence operation.

Figure 17:
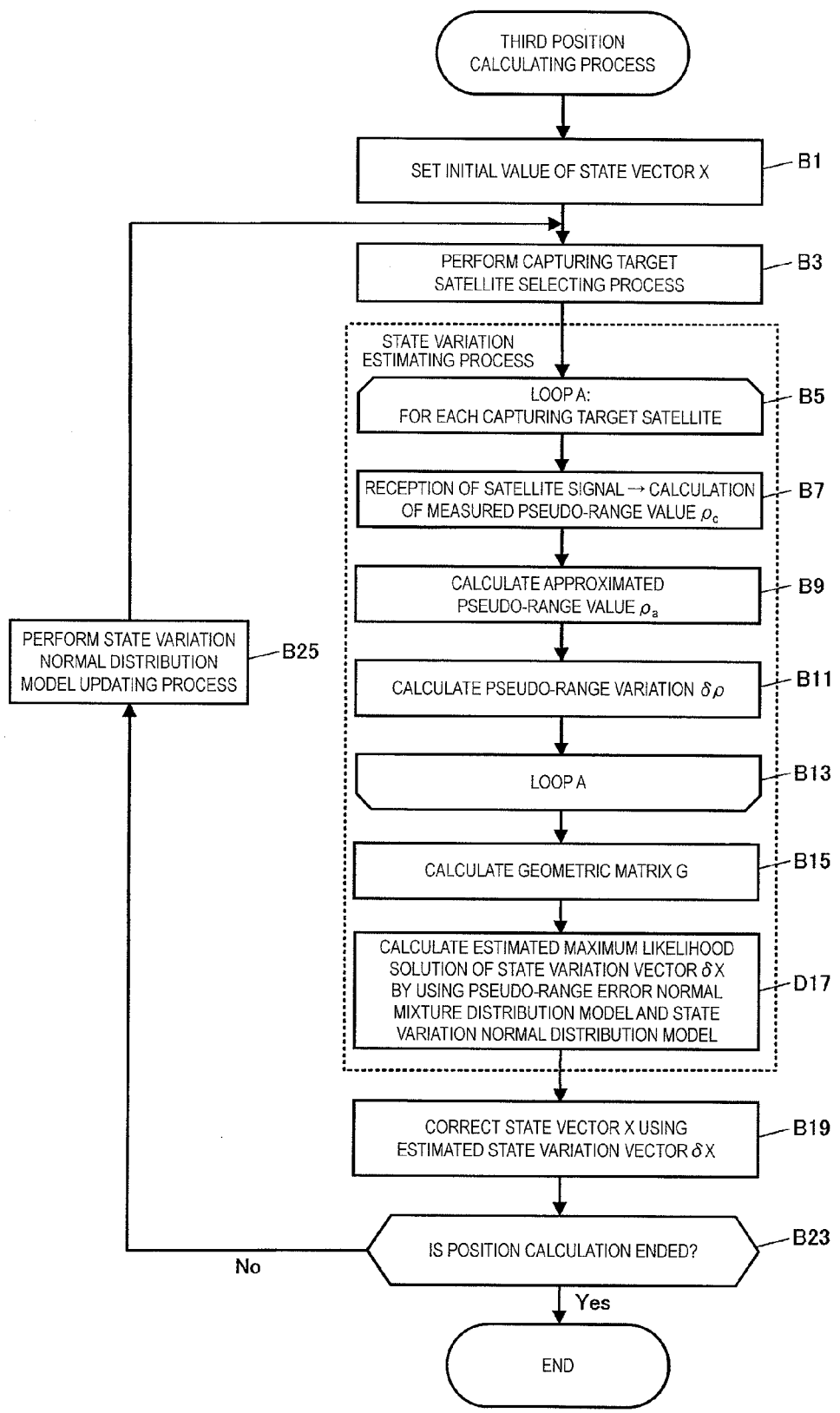
FIG. 17 is a flowchart illustrating the flow of a third position calculating process.

FIG. 17 is a flowchart illustrating the flow of a third position calculating process corresponding to the third position calculating method. The basic flow of the third position calculating process is the same as the first position calculating process of FIG. 15. However, both are different from each other, in that step B17 of the first position calculating process is replaced with step D17.

In step D17, the processing unit 21 calculates the estimated maximum likelihood solution of the state variation vector "δx" using the pseudo-range error normal mixture distribution model and the state variation normal distribution model. Specifically, the processing unit 21 calculates the estimated maximum likelihood solution of the state variation vector "δX" using Expressions (24) to (27). These steps are calculation steps using the EM algorithm.

In the third position calculating process, the processing unit 21 updates the state variation expected value vector "$\mu_{\delta X}$" using Expression (28) in the state variation normal distribution model updating process of step B25. The processing unit 21 updates the state variation covariance matrix "$S_{\delta X}$" using Expressions (29) to (32).

Figure 18:
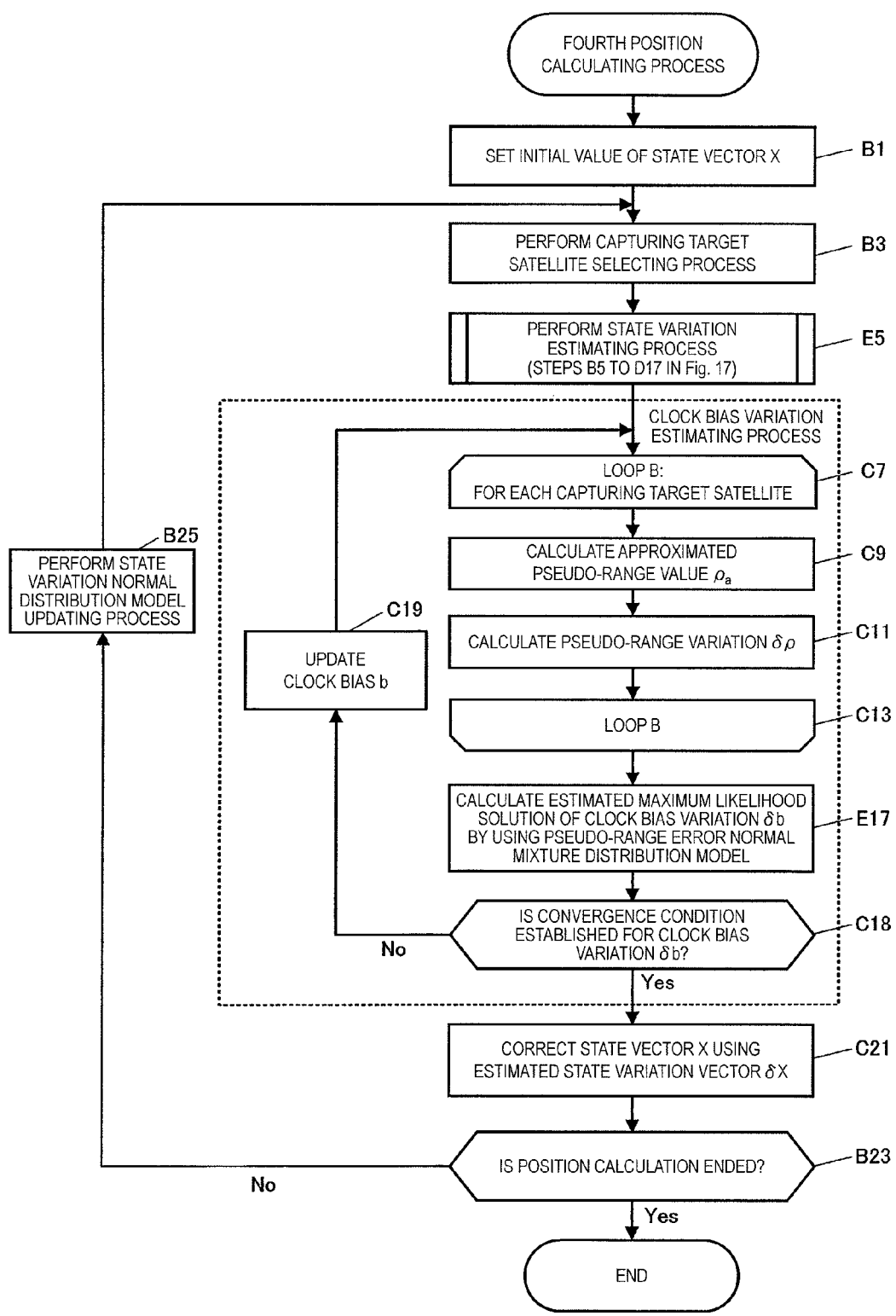
FIG. 18 is a flowchart illustrating the flow of a fourth position calculating process.

FIG. 18 is a flowchart illustrating the flow of a fourth position calculating process corresponding to the fourth position calculating method. The basic flow of the fourth position calculating process is the same as the second position calculating process of FIG. 16. However, both are different from each other, in that step C5 of the second position calculating process is replaced with step E5 and step C17 is replaced with step E17.

In the state variation estimating process of step E5 in the fourth position calculating process, the clock bias variation "δb" is treated as a non-stochastic variable and the component of the state variation vector "δX" corresponding to the clock bias variation "δb" is set to zero. That is, the state variation estimating process becomes a position variation estimating process of estimating the position variation vector "δP".

Similarly to the second position calculating process, in the state variation estimating process, the approximated pseudo-range value "$\rho_a$" is calculated using the value of the clock bias "b" calculated through the convergence operation in the previous position calculating operation (step B9). The position calculating operation is performed using the values of predetermined parameters calculated through the convergence operation in the previous position calculating operation.

In the clock bias variation estimating process of steps C7 to C19 in the fourth position calculating process, the convergence operation, for example, using the EM algorithm is performed using the pseudo-range error normal mixture distribution model (No in step C18->step C19->step C7) and the estimated maximum likelihood solution of the clock bias variation "δb" (step E17).

Then, the processing unit 21 determines whether a predetermined convergence condition is established for the clock bias variation "δb" (step C18), and corrects and updates the clock bias "b" using the clock bias variation "δb" calculated in step E17 (step C19) and performs again the process of step C7 when it is determined that the predetermined convergence condition is not established (No in step C18). When it is determined that the predetermined convergence condition is established (Yes in step C18), the processing unit 21 performs the process of step C21.

4. Operational Advantages

In this embodiment, a GPS satellite signal which is a kind of positioning satellite signal is received. The position calculating operation which is an operation using the received signal of the GPS satellite signal and which is determined on the basis of a given probability distribution model having the position and the variation of the clock bias of the GPS receiver as random variables is performed.

Specifically, a state variation normal distribution model having the position and the variation of the clock bias of the GPS receiver (position calculating device) as random variables is set. A pseudo-range error normal distribution model or a pseudo-range error normal mixture distribution model is set as the probability distribution model having the variation in error included in the pseudo-range as a random variable. Then, an operation based on the maximum likelihood estimating method is performed using the probability distribution model and the estimated maximum likelihood solution of the position and the clock bias variation is calculated. Accordingly, it is possible to calculate a position by temporally correlating the operation results with each other without independently using the operation results at the operation times. In this case, even when a great error is instantaneously mixed into the measured pseudo-range, it is possible to prevent the position calculation accuracy from being lowered.

In this embodiment, the variation reference of the operation result is updated on the basis of the result of the previous position calculating operation and the variation of the operation result is calculated using the updated reference. Specifically, the reference of the position and the clock bias variation at the current operation time are updated using the position and the clock bias variation calculated at the previous operation time. This corresponds to updating the expected value of the state variation normal distribution model.

In this embodiment, the position and the covariance of the clock bias variation at the current operation time are updated using the position and the covariance of the clock bias variation at the previous operation time. This corresponds to updating the standard deviation of the state variation normal distribution model. That is, the normal distribution model relevant to the variation of the operation result is not set to be fixed, but the normal distribution model is updated on the basis of the operation result at the previous operation time. Accordingly, it is possible to quickly cope with the temporal variation of the position and the clock bias and to accurately calculate the position of a moving object.

5. Modifications 5-1. Doppler Positioning

The position calculating method using a pseudo-range has been described in the above-mentioned embodiment, but the invention can be applied to a position calculating method using the Doppler effect substantially in the same way. The position calculating method using the Doppler effect is referred to as "Doppler positioning".

A model formula of Expression (33) is established for the Doppler positioning.

$$h_k = (V_k - V) \cdot l_k + d + \epsilon_k^h \tag{33}$$

Here, all the units in the expression are the dimension of velocity [m/s].

In Expression (33), "$h_k$" represents the drift of a frequency (hereinafter, referred to as "frequency drift") measured for the k-th captured satellite. That is, the frequency drift is calculated as a difference between the frequency (reception frequency) of the received signal of a GPS satellite signal and a prescribed carrier frequency (1.57542 [GHz]). The reception frequency can be acquired by performing a correlation operation in the frequency direction.

"$V_k$" represents the velocity vector of the k-th captured satellite and "V" represents the velocity vector of the GPS receiver. Accordingly, "$V_R = V_k - V$" represents the relative velocity vector between the GPS receiver and the k-th captured satellite. "$l_k$" represents the line-of-sight vector directed from the GPS receiver to the k-th captured satellite. By projecting the relative velocity vector "$V_R = V_k - V$" to the direction of the line-of-sight vector "$l_k$", the relative velocity vector (Doppler shift) in the line-of-sight direction is calculated.

In Expression (33), "d" represents the drift (clock drift) of the operation clock of the GPS receiver. "$\epsilon_k^h$" represents the observation error included in the frequency drift of the k-th captured satellite.

It can be considered that the Newton's method is applied to Expression (33). A state vector "$X = (P, b, V, d)^T$" having the position vector "P", the clock bias "b", the velocity vector "V", and the clock drift "d" of the GPS receiver as components is defined. That is, the clock bias, the velocity information, and the clock drift in addition to the position information are defined as the state vector "X".

Here, a function "g(P, V)" of Expression (34) is defined which is expressed as "the right side"–"the left side" of Expression (33).

$$g_k(P,V) = (V_k - V) \cdot l_k + d - h_k + \epsilon_k^h \quad (34)$$

The function "g" includes the velocity vector "V" and the line-of-sight vector "l". The line-of-sight vector "l" has the position vector "P" as a variable. Accordingly, the function "g" is a function having the position vector "P" and the velocity vector "V" as variables.

By partially differentiating the function "g(P, V)" with respect to the position vector "P", the velocity vector "V", the clock bias "b", and the clock drift "d", Expressions (35) to (38) are obtained.

$$\frac{\partial g_k(P,V)}{\partial P} = -\frac{V_k - V}{\|P_k - P\|} + \frac{1}{\|P_k - P\|^3}\begin{pmatrix}(v_{k,x} - v_x)(x_k - x)^2 \\ (v_{k,y} - v_y)(y_k - y)^2 \\ (v_{k,z} - v_z)(z_k - z)^2\end{pmatrix} \quad (35)$$

$$\frac{\partial g_k(P,V)}{\partial V} = -l_k \quad (36)$$

$$\frac{\partial g_k(P,V)}{\partial b} = 0 \quad (37)$$

$$\frac{\partial g_k(P,V)}{\partial d} = 1 \quad (38)$$

Here, a function "G(P, V)" collecting up the functions "g(P, V)" for the K captured satellites is referred to as an observation function for convenience and is defined as Expression (39).

$$G(P,V) = \begin{bmatrix} g_1(P,V) \\ g_2(P,V) \\ \vdots \\ g_K(P,V) \end{bmatrix} \quad (39)$$

In this case, an observation equation of Expression (40) is established.

$$(-G(P_0, b_0, V_0, d_0)) = \left(\left.\frac{\partial G}{\partial(P, b, V, d)}\right|_{(P_0,b_0,V_0,d_0)}\right)\begin{bmatrix} \delta P \\ \delta b \\ \delta V \\ \delta d \end{bmatrix} \to -G \quad (40)$$

$$= Y\delta X$$

The left side of Expression (40) is the value "$G(P_0, b_0, V_0, d_0)$" of the observation function which is determined depending on the initial value "$P_0$" of the position vector, the initial value "$b_0$" of the clock bias, the initial value "$V_0$" of the velocity vector, and the initial value "$d_0$" of the clock drift.

In the right side of Expression (40), the vector "$(\delta P, \delta b, \delta V, \delta d)^T$" is defined as the state variation vector "$\delta X$" indicating the variation of the state vector "X". For convenience, a matrix defined as the partial differential of the observation function "G" with respect to the respective variables is defined as a partial differential matrix "Y". The state variation vector "$\delta X$" is multiplied by the value of the partial differential matrix "Y" determined depending on the initial values of the variables.

In this way, the observation equation of Expression (40) having the state variation vector "$\delta X = (\delta P, \delta b, \delta V, \delta d)^T$" as an unknown is derived from Expression (33). Similarly to the above-mentioned embodiment, the estimated maximum likelihood solution of the state variation vector "$\delta X$" is calculated using the observation equation. This modification is different from the above-mentioned embodiment, in that the observation equation serving as the basis of the position calculating operation is changed from Expression (3) to Expression (40).

In this case, a probability distribution model having all or some of the calculation parameters "($\delta x, \delta y, \delta z, \delta b, \delta v_x, \delta v_y, \delta v_z, \delta d$)" included in the state variation vector "$\delta X = (\delta P, \delta b, \delta V, \delta d)^T$" as random variables is defined. The clock bias, the velocity information, and the variation in the clock drift are treated as random variables.

When all of eight calculation parameters are treated as random variables, the multi-dimensional state variation normal distribution model of Expression (8) is defined as an eight-dimensional state variation normal distribution model "$p_{\delta X}^{(8)}(\delta X)$". For example, when six calculation parameters other than the clock bias "b" and the clock drift "d" out of eight calculation parameters are used as random variables, the multi-dimensional state variation normal distribution model of Expression (8) is defined as a six-dimensional state variation normal distribution model "$p_{\delta X}^{(6)}(\delta X)$".

Since Expression (40) has eight unknowns, it is necessary to capture at least eight satellites for the solution. Therefore, it is practical to study the reduction of the number of unknowns. For example, the velocity vector "V" is set to a fixed value (for example, zero) and the position vector "P", the clock bias "b", and the clock drift "d" are set to unknowns. In this case, the observation equation of Expression (40) can be changed to Expression (41).

$$(-G(P_0, b_0, V_0, d_0)) = \left(\left.\frac{\partial G}{\partial(P, b, d)}\right|_{(P_0,b_0,V_0,d_0)}\right)\begin{bmatrix} \delta P \\ \delta b \\ \delta d \end{bmatrix} \quad (41)$$

In Expression (41), the state variation vector indicating the variation of the state vector "X" is defined as "$\delta X = (\delta P, \delta b, \delta d)^T$". By setting the velocity vector "$V = (v_x, v_y, v_z)$" to a fixed value, the number of unknowns can be reduced from eight to five. Accordingly, when at least five satellites can be captured, the solution of Expression (41) can be calculated.

Figure 19:
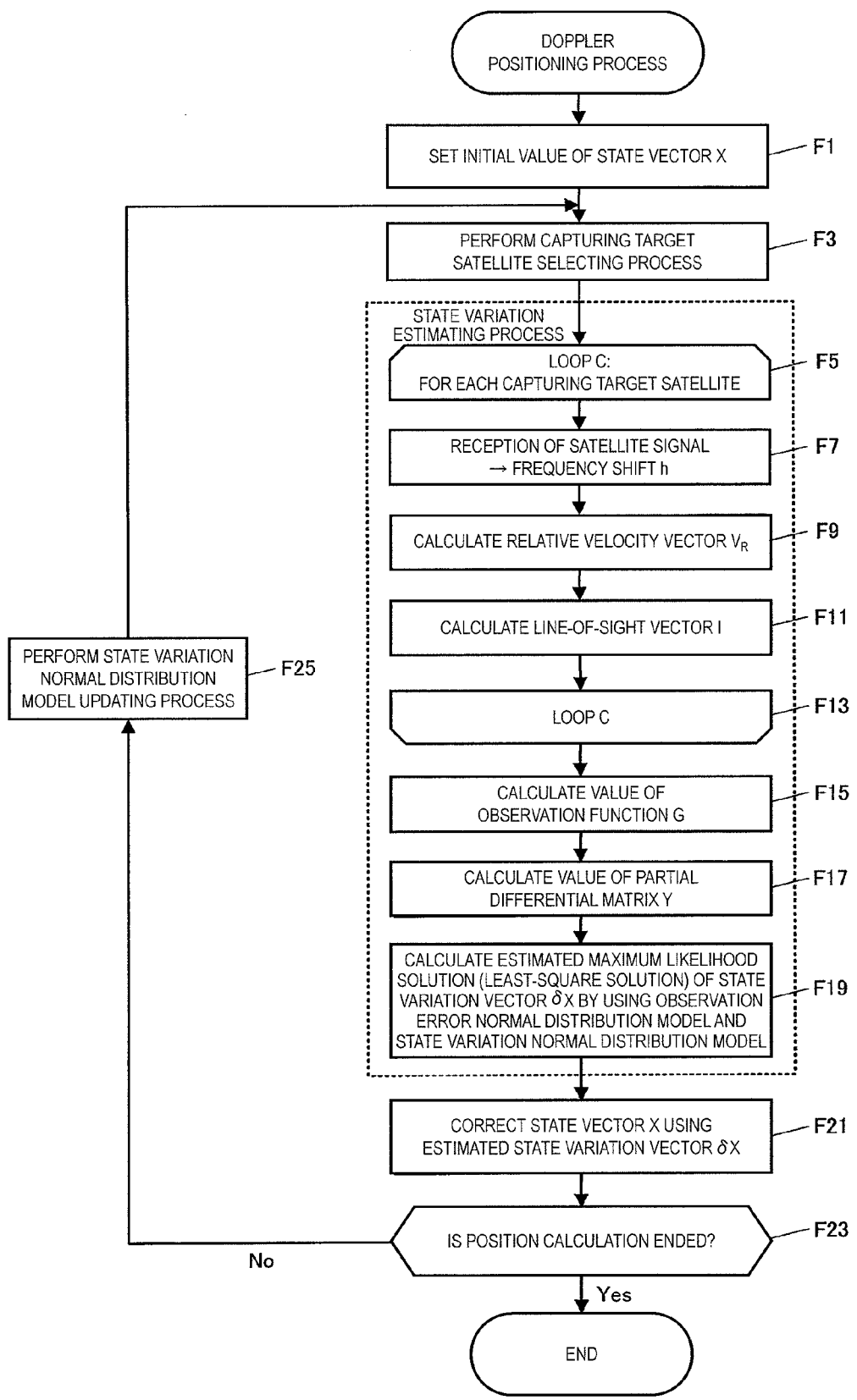
FIG. 19 is a flowchart illustrating the flow of a Doppler positioning process.

FIG. 19 is a flowchart illustrating the flow of a Doppler positioning process performed by the processing unit in the above-mentioned embodiment. This Doppler positioning process can be replaced for the position calculating process in step A1 of the baseband process shown FIG. 14. This Doppler positioning process is a process based on the observation equation of Expression (40) and corresponds to the first position calculating process of FIG. 15 in which all the calculation parameters of the state variation vector "δX" are treated as random variables.

First, the processing unit 21 sets the initial value of the state vector "X" (step F1). That is, the position vector "P", the clock bias "b", the velocity vector "V", and the clock drift "d" are set to predetermined initial values.

The processing unit 21 performs a capturing target satellite selecting process (step F3). Then, the processing unit 21 performs a state variation estimating process (steps F5 to F19). Specifically, the processing unit 21 performs the processes of loop C on the respective capturing target satellites (steps F5 to F13).

In loop C, the processing unit 21 receives a GPS satellite signal from the corresponding capturing target satellite and calculates the frequency drift "h" (step F7). The frequency drift "h" is calculated as a difference between the frequency (reception frequency) of the received signal acquired by performing the frequency search and the frequency (prescribed carrier frequency) of a prescribed carrier. The frequency drift "h" is a measured quantity in the Doppler positioning.

The processing unit 21 calculates the relative velocity vector "$V_R$" between the position calculating device and the corresponding capturing target satellite (step F9). The relative velocity vector "$V_R$" is calculated using the newest velocity vector "V" of the position calculating device and the newest velocity vector "$V_k$" of the corresponding capturing target satellite. The initial value "$V_0$" of the velocity vector is set as the newest velocity vector in the first positioning and the velocity vector calculated in the previous positioning is set as the newest velocity vector in the second or subsequent positioning.

Thereafter, the processing unit 21 calculates the line-of-sight vector "l" directed from the position calculating device to the corresponding capturing target satellite (step E11). The line-of-sight vector "l" is calculated using the newest position vector "P" of the position calculating device and the newest position vector "$P_k$" of the corresponding capturing target satellite. The initial value "$P_0$" of the position vector is set as the newest position vector in the first positioning and the position vector calculated in the previous positioning is set as the newest position vector in the second or subsequent positioning.

Thereafter, the processing unit 21 performs the processes on the next capturing target satellite. After performing the processes of steps F7 to F11 on all the capturing target satellites, the processing unit 21 ends the processes of loop C (step F13).

After ending the processes of loop C, the processing unit 21 calculates the value of the observation function "G" in the left side of Expression (40) using the newest position vector "P", the clock bias "b", the velocity vector "V", and the clock drift "d" (step F15). The processing unit 21 calculates the value of the partial differential matrix "Y" in the right side of Expression (40) using the newest position vector "P", the clock bias "b", the velocity vector "V", and the clock drift "d" (step F17).

Then, the processing unit 21 calculates the estimated maximum likelihood solution of the state variation "δX" using the observation error normal distribution model and the state variation normal distribution model on the basis of the observation equation of expression 40 (step F19). The observation error normal distribution model is a model in which the observation error "$\epsilon^h$" included in the frequency drift "h" as a measured quantity is set as a random variable and a normal distribution is assumed as the distribution thereof.

After performing the process of step F19, the processing unit 21 ends the state variation estimating process. The subsequent steps are the same as in the first position calculating process.

Although the flowchart is neither shown nor described, the Doppler positioning processes corresponding to the second to fourth position calculating processes shown in FIGS. 16 to 18 can be constructed in the same way.

5-2. Random Variable

The probability distribution model having the variation of the operation result of the position calculating operation as a random variable has been defined in the above-mentioned embodiment, but a probability distribution model having the operation result itself of the position calculating operation as a random variable may be defined to perform the position calculating operation.

Attention is paid to the position vector "P". The position vector "P" is calculated by adding the position variation vector "δP" to the initial value "$P_0$" of the position vector. Since the initial value "$P_0$" of the position vector is fixed, the treating of the position variation vector "δP=P−$P_0$" as a random variable causes the same result as the treating of the position vector "P" as a random variable. Accordingly, the position calculating operation may be performed using the position vector "P" as a random variable instead of the position variation vector "δP". The same is true of the clock bias "b", the velocity vector "V", and the clock drift "d".

In this case, for example, a state normal distribution model having the state vector "X" itself of the GPS receiver as a random variable is defined. The position calculating operation is performed using the state normal distribution model in the same way as in the above-mentioned embodiment. In the updating of the state normal distribution model, the expected value or the standard deviation of the state normal distribution model is updated using the position vector "P" or the clock bias "b" which is previously calculated.

5-3. Updating of State Variation Normal Distribution Model

The state variation normal distribution model has been updated on the basis of the result of the position calculating operation before one clock in the above-mentioned embodiment, but this is only an example. For example, the state variation normal distribution model may be updated on the basis of the result of the position calculating operation before two or three clocks.

The results of the position calculating operation during predetermined previous clocks (for example, during five clocks or ten clocks) may be averaged and the state variation normal distribution model may be updated on the basis of the averaging result. In the averaging process, a simple arithmetic mean or geometric mean may be used or a weighted means may be used. When the weighted mean is used, it is effective that a larger weight is assigned to the result of the position calculating operation at the time closer to the current operation time to calculate a weighted mean.

The state variation normal distribution model may be updated using reference information which can be externally acquired. For example, when the position calculating device according to the invention is mounted on a moving object such as a vehicle and the speed or the moving direction (that is, the velocity vector) of the moving object can be acquired as the reference information from a vehicle speed detecting system (for example, a vehicle speed pulse) or a direction sensor such as a magnetic sensor, the state variation normal distribution model may be updated using the reference information.

Specifically, the position vector "P" at the current operation time is calculated by adding the velocity vector "V" to the newest position vector "P" of the moving object. Since the position vector "P" can be calculated in this way, the variation of the position vector "δP" for each operation time can be calculated. Accordingly, the position variation vector "δP" can be calculated using the velocity vector "V" and the state variation expected value vector "$\mu_{\delta x}$" can be updated using the calculated position variation vector.

The standard deviation of the state variation normal distribution model can be updated in the same way. When the traveling direction of the moving object is known, it can be thought that since the velocity components in the directions other than the traveling direction are almost zero, the error in position or speed in the directions is almost zero. Therefore, it is effective that the state variation covariance matrix "$S_{\delta x}$" is updated so as to set the components of the covariance corresponding to the directions other than the traveling direction of the moving object in the state variation covariance matrix "$S_{\delta x}$" to a small value (for example, zero).

5-4. Non-Stochastic Variable

It has been stated in the above-mentioned embodiment that out of the calculation parameters which can be calculated through the position calculating operation, the components of the position vector "P" are set as random variables and the clock bias "b" is set as a non-stochastic variable. However, this is only an example and the calculation parameters to be set as random variables and non-stochastic variables can be appropriately selected.

For example, variations of some components of three-dimensional position components may be set as random variables. Specifically, the position variation "δz" in the height direction in the position variation vector "δP" may be set as a non-stochastic variable and a predetermined convergence operation using the received signal may be performed on "δz" to calculate an approximate solution. Two types of calculation parameters of the position variation "δz" in the height direction and the clock bias variation "δb" may be set as non-stochastic variables and a convergence operation may be performed on "δz" and "δb" to calculate approximate solutions.

5-5. Maximum Likelihood Estimation Algorithm

It has been stated in the above-mentioned embodiment that the EM algorithm is used as an algorithm for maximum likelihood estimation, but other algorithms may be used. For example, a gradient method known as a hill-climbing method may be used. The gradient method is a kind of algorithm to an optimization problem and is a technique of optimizing parameters using the gradient of a predetermined estimation function.

5-6. Electronic Apparatus

It has been stated in the above-mentioned embodiment that the mobile phone is exemplified as the electronic apparatus including the GPS receiver, but the invention is not limited to such an electronic apparatus. For example, the invention may be similarly applied to electronic apparatuses such as a car navigation apparatus, a portable navigation apparatus, a PC, a PDA (Personal Digital Assistant), and a wristwatch.

5-7. Satellite Positioning System

Although the GPS is exemplified as the satellite positioning system in the above-mentioned embodiment, other satellite positioning systems such as WAAS (Wide Area Augmentation System), QZSS (Quasi Zenith Satellite System), GLONASS (GLObal Navigation Satellite System), and GALILEO may be used.

5-8. Main Constituent of Process

In the above-mentioned embodiment, it has been stated that the processing unit disposed in the GPS receiver unit performs the position calculating process. That is, in the above-mentioned embodiment, it has been stated that the GPS receiver unit (the baseband processing circuit unit) serves as the position calculating device. However, the main constituent of the position calculating process may be set to the host processing unit which is a processor of an electronic apparatus.

In this case, for example, the processing unit of the baseband processing circuit unit captures a GPS satellite signal, calculates and acquires measurement information, and outputs the acquired measurement information to the host processing unit. Then, the host processing unit performs the position calculating operation based on the above-mentioned principles using the measurement information input from the processing unit. In this case, the electronic apparatus (the host processing unit) serves as the position calculating device.

What is claimed is:

1. A position calculating method comprising:
receiving, by a position calculating device comprising a processor, a positioning signal;
performing, by a position calculating device, a position calculating operation for calculating a position using the received positioning signal, the position calculating operation for being an operation based on a given probability distribution model having at least a variation in previous operation result as a random variable, wherein the operation includes updating a criterion of the variation based on the previous operation result; and calculating the variation using the criterion; and
providing, by the position calculating device, the calculated position to a display device for display of the calculated position on a map.

2. The position calculating method according to claim 1, wherein the position calculating operation is an operation based on a normal distribution model having at least the previous operation result as a random variable, and
wherein the position calculating method further comprises updating the normal distribution model based on the previous operation result.

3. The position calculating method according to claim 2, further comprising measuring a pseudo-range based on the received positioning signal,
wherein the position calculating operation is an operation based on the normal distribution model having the variation of the previous operation result as a random variable and a probability distribution model having an error included in the pseudo-range as a random variable.

4. The position calculating method according to claim 3, wherein the probability distribution model having the error included in the pseudo-range as a random variable is a normal distribution model or a normal mixture distribution model.

5. The position calculating method according to claim 2, wherein the position calculating operation is an operation of calculating at least any one of position information, clock bias, velocity information, and clock drift, and
wherein the normal distribution model is a model having variations of elements of the previous operation result as random variables.

6. The position calculating method according to claim 1, further comprising calculating a value of a predetermined parameter out of calculation parameters by performing a predetermined convergence operation using the received signal, the calculation parameters being able to be calculated through the use of the position calculating operation,
  wherein the position calculating operation is an operation using the value of the predetermined parameter previously calculated through the use of the convergence operation.

7. A position calculating device comprising:
a RF (radio frequency) receiving circuit that receives a positioning signal; and
a processor coupled to a storage unit including one or more memories, the processor:
  performing a position calculating operation for calculating a position using the positioning signal received by the RF receiving circuit, the position calculating operation being an operation based on a given probability distribution model having at least a variation in previous operation result as a random variable, wherein the operation includes updating a criterion of the variation based on the previous operation result; and calculating the variation using the criterion; and
  providing the calculated position to a display device for display of the calculated position on a map.

* * * * *